(12) United States Patent
Morita et al.

(10) Patent No.: US 11,097,765 B2
(45) Date of Patent: Aug. 24, 2021

(54) STEERING WHEEL

(71) Applicant: TOYODA GOSEI CO., LTD., Kiyosu (JP)

(72) Inventors: Bunpei Morita, Kiyosu (JP); Satomi Akehi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/934,448

(22) Filed: Jul. 21, 2020

(65) Prior Publication Data

US 2021/0024115 A1    Jan. 28, 2021

(30) Foreign Application Priority Data

Jul. 26, 2019  (JP) .............................. JP2019-138126
Jul. 26, 2019  (JP) .............................. JP2019-138127

(51) Int. Cl.
*B62D 1/06* (2006.01)
*B62D 1/10* (2006.01)

(52) U.S. Cl.
CPC . *B62D 1/06* (2013.01); *B62D 1/10* (2013.01)

(58) Field of Classification Search
CPC .............. B62D 1/04; B62D 1/06; B62D 1/10
See application file for complete search history.

(56) References Cited

U.S. PATENT DOCUMENTS

| | | | | |
|---|---|---|---|---|
| 4,807,951 A | * | 2/1989 | Moss | G03H 1/22 359/32 |
| 5,897,133 A | * | 4/1999 | Papandreou | B62D 1/10 280/728.2 |
| 6,095,552 A | * | 8/2000 | Hosoi | B62D 1/04 280/731 |
| 6,153,996 A | * | 11/2000 | Nigrin | B62D 1/04 318/488 |
| 2007/0205625 A1 | * | 9/2007 | Lai | G06F 3/04883 296/70 |
| 2012/0240720 A1 | | 9/2012 | Nokura et al. | |
| 2017/0166156 A1 | * | 6/2017 | Li | B60R 21/203 |

(Continued)

FOREIGN PATENT DOCUMENTS

| | | |
|---|---|---|
| JP | H03-025375 U | 3/1991 |
| JP | 2001-055149 A | 2/2001 |
| JP | 2001-260909 A | 9/2001 |

(Continued)

*Primary Examiner* — Prasad V Gokhale
(74) *Attorney, Agent, or Firm* — Posz Law Group, PLC

(57) ABSTRACT

A steering wheel configured to be rotated around a central axis of rotation includes a boss section that is located in a lower portion of the steering wheel and in a vicinity of the central axis of rotation, an outer peripheral portion that is disposed in an outer edge of the steering wheel in a circumference of the boss section, and a central portion that covers an entirety of a region located farther towards the boss section than the outer peripheral portion including a region above the boss section. The outer peripheral portion includes a grip portion to be gripped by the driver. The central portion includes a raised portion that protrudes farther upward than the outer peripheral portion along the central axis of rotation. The raised portion includes, in the upper portion, a cushion portion having such a resiliency that makes the cushion portion restorably dentable.

18 Claims, 16 Drawing Sheets

(56) References Cited

U.S. PATENT DOCUMENTS

2020/0171947 A1* 6/2020 Derrick .................. G06F 3/041

FOREIGN PATENT DOCUMENTS

| JP | 2003-212131 A | 7/2003 |
| JP | 2011-235702 A | 11/2011 |
| JP | 2012-201164 A | 10/2012 |
| JP | 2013-025620 A | 2/2013 |

* cited by examiner

STEERING WHEEL

CROSS REFERENCE TO RELATED APPLICATIONS

The present application claims priority from Japanese Patent Application No. 2019-138126 of Akehi, filed on Jul. 26, 2019, and Japanese Patent Application No. 2019-138127 of Morita et al., filed on Jul. 26, 2019, the entire disclosures of which are incorporated herein by reference.

BACKGROUND

1. Technical Field

The present invention relates to a steering wheel that is gripped and rotated about a central axis of rotation by a driver for steering of a vehicle.

2. Description of Related Art

Japanese Unexamined Utility Model Application Publication No. Hei 3-025375 discloses a steering wheel that a pillow can be attached thereon for a driver to take a rest or nap when not driving.

However, in order to use this steering wheel for a rest purpose, the driver has to attach a separate pillow to the steering wheel.

It would be desirable to provide a steering wheel that is able to be used as a pillow to take a rest without a complicated procedure, and is also able to be steered smoothly.

Japanese Unexamined Patent Application Publication No. 2012-201164 discloses a steering wheel that includes a boss section which is disposed on a central axis of rotation of the steering wheel, a generally annular outer peripheral portion (or rim) which is disposed in an outer edge of the steering wheel in a direction orthogonal to the central axis of rotation in a circumference of the boss, the outer peripheral portion including a grip portion to be held by a driver, and a plurality of spokes that connect the boss section and the outer peripheral portion. The spokes extend radially from the boss to the outer peripheral portion, thereby forming an opening between the spokes. The driver holds the outer peripheral portion by putting his thumbs into the opening, laying a thumb-side of his palm on an inner surface of the outer peripheral portion and using other fingers. The driver thus holds the outer peripheral portion and rotates the steering wheel in a desired direction for driving. The outer peripheral portion of the steering wheel includes a generally annular core (or supporting member) of aluminum light alloy or the like, and a clad portion of urethane or the like which is mounted around the core for improving the touch feeling.

The opening provided in the inner side of the outer peripheral portion receives driver's thumbs and makes the above steering wheel easy to hold. If a steering wheel is not provided with such an opening between the outer peripheral portion and the center portion such as the boss section, it would be difficult to hold and steer.

It would also be desirable to provide a steering wheel that is not provided with an opening for receiving driver's thumbs in a region between a boss section and an outer peripheral portion to be held for steering, but is easy to hold for steering and, has a nice touch feeling.

SUMMARY

An exemplary embodiment of the invention relates to a steering wheel adapted to be held by a driver and rotated around a central axis of rotation. The steering wheel includes a boss section that is located in a lower portion of the steering wheel and in a vicinity of the central axis of rotation; an outer peripheral portion that is disposed in an outer edge of the steering wheel in a direction orthogonal to the central axis of rotation in a circumference of the boss section; a grip portion that is located in the outer peripheral portion to be held by the driver for steering operation, and a central portion that covers an entirety of a region located farther towards the boss section than the outer peripheral portion including a region above the boss section. The central portion includes a raised portion that protrudes farther upward than the outer peripheral portion along the central axis of rotation. The raised portion includes, in the upper portion, a cushion portion having such a resiliency that makes the cushion portion restorably dentable.

In the steering wheel of the exemplary embodiment, it is desired that a sheet member composed of a fabric is disposed on an outer surface of the cushion portion.

In the steering wheel of the exemplary embodiment, it is also desired that the raised portion is located in an inner side of the outer peripheral portion, and that, when viewed from above, each of the outer peripheral portion and the raised portion has a generally oval shape in which a width in a front and back direction is smaller than a width in a left and right direction.

In this case, it is further desired that the outer peripheral portion as viewed from above has such a curved shape that an outer shape of the front edge has a greater curvature radius than that of the rear edge.

In the steering wheel of the exemplary embodiment, it is also desired that the grip portion is disposed in an entire circumference of the outer peripheral portion; and that the raised portion of the central portion is located in an inner side of the outer peripheral portion such that a width in a front and back direction of a rear edge portion of the outer peripheral portion as viewed from above is greater than a width in the front and back direction of a front edge portion of the outer peripheral portion as viewed from above.

In the steering wheel of the exemplary embodiment, it is also desired that the cushion portion of the central portion is composed of a resilient material that has a bowl shape which interiorly has a void space.

In this case, the steering wheel may further include a projection device that is located inside of the central portion and configured to project a predetermined image on a back surface of the cushion portion; and a sheet member that is disposed on an outer surface of the raised portion and configured to allow the image projected by the projection device to be visible from an outside of the sheet member.

Another exemplary embodiment relates to a steering wheel adapted to be held by a driver and rotated around a central axis of rotation, and including:

a boss section that is located in a lower portion of the steering wheel and in a vicinity of the central axis of rotation;

an outer peripheral portion that is disposed in an outer edge of the steering wheel in a direction orthogonal to the central axis of rotation in a circumference of the boss section;

a grip portion that is disposed in an entire circumference of the outer peripheral portion to be held by the driver for steering operation;

a central portion that covers an entirety of a region located farther towards the boss section than the outer peripheral portion including a region above the boss section;

a supporting member for forming a skeleton of the steering wheel, the supporting member having a rigidity and such a shape that the boss section, the outer peripheral portion and the central portion are interconnected, the supporting member including a boss supporting portion that is located in the boss section, a peripheral supporting portion that is located in the outer peripheral portion, and a connecting portion that is located in the central portion and connects the boss supporting portion and the peripheral supporting portion; and a clad portion that is softer than the supporting member, and is mounted around at least the peripheral supporting portion and a portion of the connecting portion adjoining the peripheral supporting portion.

The peripheral supporting portion of the supporting member includes:

an annular protrusive portion that is located in a vicinity of an outer edge of the peripheral supporting portion and protrudes downwardly along the central axis of rotation, the annular protrusive portion being arranged in the entire circumference of the outer peripheral portion of the steering wheel; and an annular flat portion that is located in an upper surface of the annular protrusive portion and extends flatly towards the connecting portion in a direction generally orthogonal to the central axis of rotation, the annular flat portion being arranged in the entire circumference of the outer peripheral portion of the steering wheel.

The grip portion includes:

a grip body that is adapted to be held by the driver, the grip body having a structure that the clad portion is disposed on the upper surface, an outer surface, and a lower surface of the annular protrusive portion of the peripheral supporting portion of the supporting member, thus the grip body including an upper surface located above the upper surface of the annular protrusive portion, a lower surface located below the annular protrusive portion, and an outer surface located on an outer side of the annular protrusive portion; and a storing cove portion for receiving fingers of the driver, the storing cove portion being located in an inner side of the annular protrusive portion in an underside of the annular flat portion of the outer peripheral portion of the supporting member and in a region where the clad portion is disposed, the storing cove portion being configured to be recessed farther upwardly than a portion of the lower surface of the grip body in a vicinity of a lower end of the annular protrusive portion, at least when the grip portion is held by the driver.

The storing cover portion may be formed in the grip portion originally, by setting a thickness of the clad portion in an underside of the grip portion so that the storing cover portion is recessed farther upward than the lower surface of the grip body.

Alternatively, the storing cover portion may be formed when held by the driver. In that case, it is conceivable that, in an underside of the outer peripheral portion, a clad portion is configured to have such a thickness that makes a region from the lower surface of the grip body to a vicinity of the connecting portion via the storing cove portion generally flat, and the clad portion is configured to have such a hardness that allows the clad portion to be elastically deformed for forming the storing cove portion when held by the driver.

DETAILED DESCRIPTION

Figure 1:
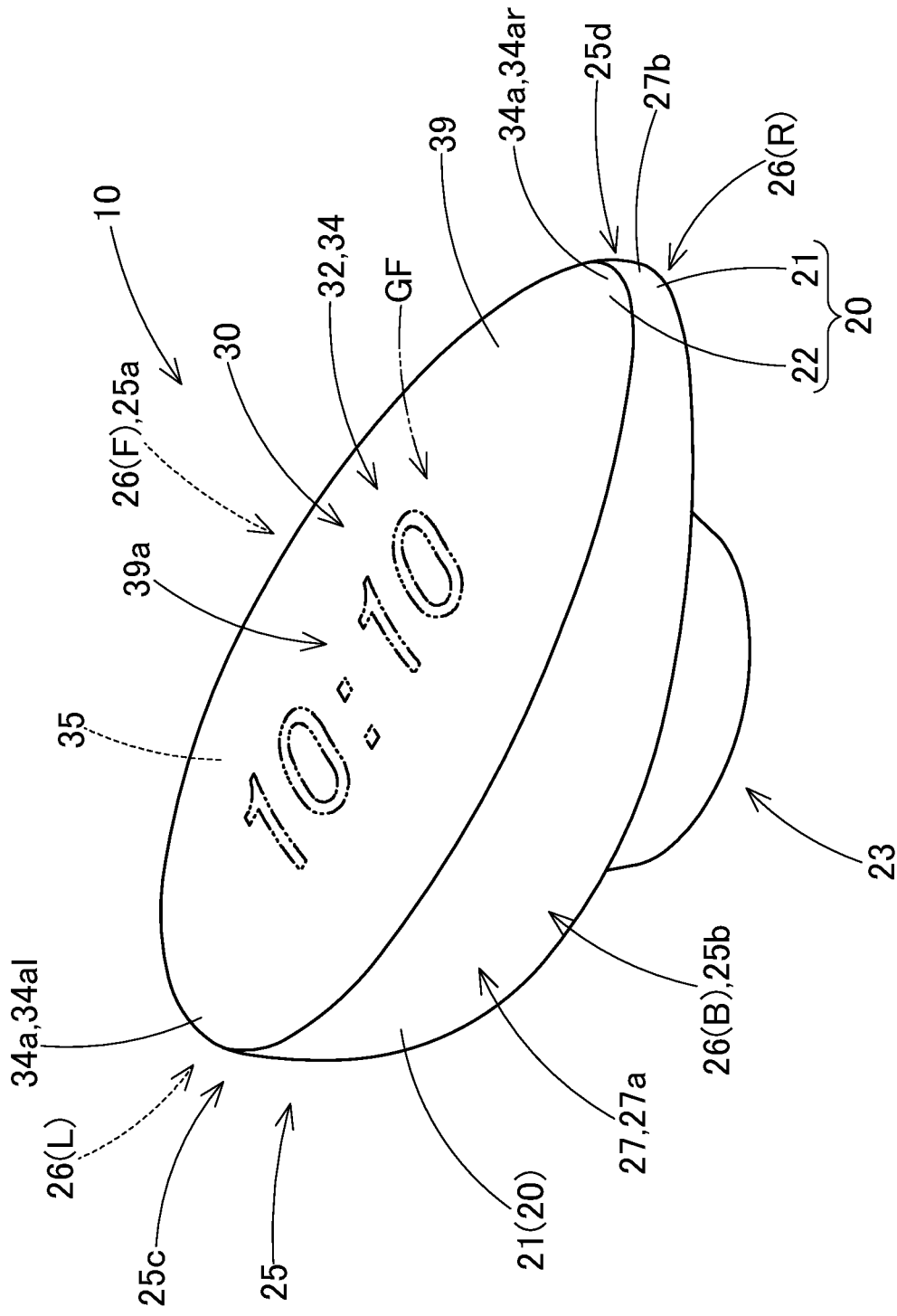
FIG. 1 is a schematic perspective view of a steering wheel in accordance with an exemplary embodiment.

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

As shown in FIGS. 1 to 6, a steering wheel 10 in accordance with an exemplary embodiment includes a boss section 23 which is disposed in a lower portion of the steering wheel 10 and in a vicinity of a central axis C1 of rotation, an outer peripheral portion 25 which is disposed in an outer edge of the steering wheel 10 in a direction orthogonal to the central axis C1 of rotation in a circumference of the boss section 23, and a central portion 30 which covers an entirety of a region disposed farther towards the boss section 23 than the outer peripheral portion 25 including a region disposed above the boss section 23. In other words, in the exemplary embodiment, the boss section 23 is located beneath a generally central area of the central portion 30. The outer peripheral portion 25 includes a grip portion 26 to be gripped by a driver for steering operation. In the steering wheel 10 in accordance with the exemplary embodiment, the central portion 30 covering the entirety of the portion towards the boss section 23 from the outer peripheral portion 25 is not provided with an opening which would allow a finger to be inserted there into.

The steering wheel 10 interiorly includes a supporting member 11 that has rigidity and forms a skeleton of the steering wheel 10. The steering wheel 10 has such a shape that the boss section 23, the outer peripheral portion 25 and the central portion 30 are interconnected. The supporting member 11 includes a boss supporting portion 12 located in the boss section 23, a peripheral supporting portion 16 located in the outer peripheral portion 25, and a connecting portion 14 which is located in the central portion 30 and connects the boss supporting portion 12 and peripheral supporting portion 16. The supporting member 11 is formed from such metal as a light alloy of aluminum or the like or steel, such synthetic resin as polypropylene with filler, polyamide, ABS or the like. The supporting member 11 is formed by casting, injection molding, or the like.

The boss supporting portion 12 of the supporting member 11 is connected with a steering shaft 1 of the vehicle which is coaxially arranged with the central axis C1 of rotation, and rotates the steering shaft 1 when the steering wheel 10 is rotated. The boss supporting portion 12 is provided with a boss core 12a of steel or the like for enhancing a connecting strength with the steering shaft 1.

The steering shaft 1 is provided with a not-shown sensor for detecting a rotation angle of the steering shaft 1. A not-shown predetermined control device steers the drive wheels of the vehicle in response to an electric signal of the rotation angle (or steering angle) fed from the sensor.

A tilt mechanism 3 is provided in a vicinity of the steering shaft 1 for adjusting a column angle θc (FIG. 3) of the steering shaft 1 as well as the central axis C1 of rotation. If an operating lever 6 of the tilt mechanism 3 is moved to a release position that allows the case 4 supporting the steering shaft 1 to move about an oscillation center 5, the column angle θc of the steering shaft 1 can be adjusted. When the column angle θc of the steering shaft 1 is adjusted to a desired angle, the operating lever 6 is moved back to a lock position so that the case 4 is engaged in the adjusted angle position about the oscillation center 5. If the column angle θc of the steering shaft 1 is adjusted by the tilt mechanism 3 this way, an arrangement angle of a later-described cushion portion 34 arranged in the central portion 30 is adjusted, so a driver MD (dashed-and-double-dotted lines in FIGS. 5 and 6) is able to rest on the cushion portion 34 engaged in the desired arrangement position.

Figure 5:
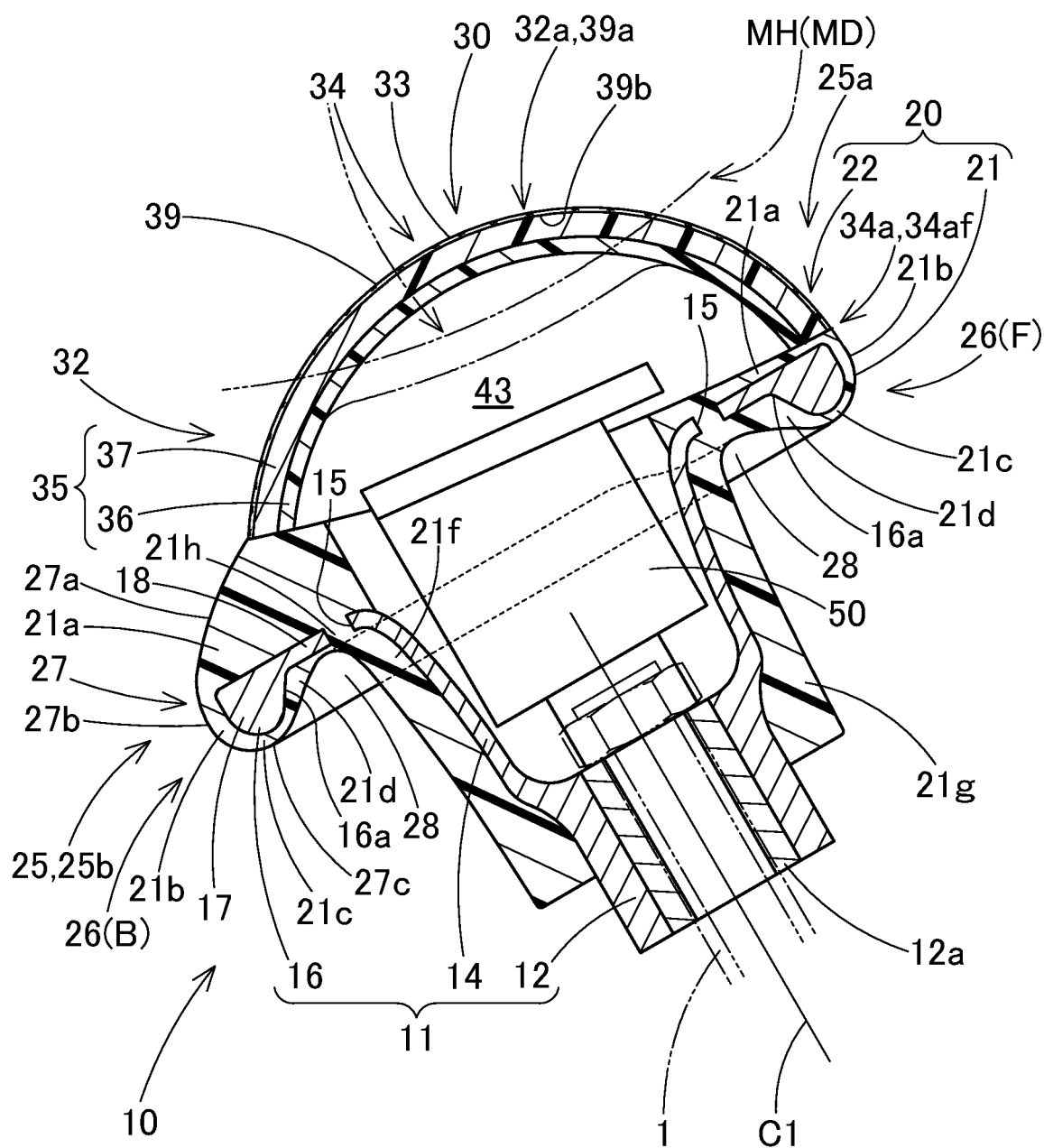
FIG. 5 is a schematic sectional view taken along line V-V of FIG. 2.
Figure 6:
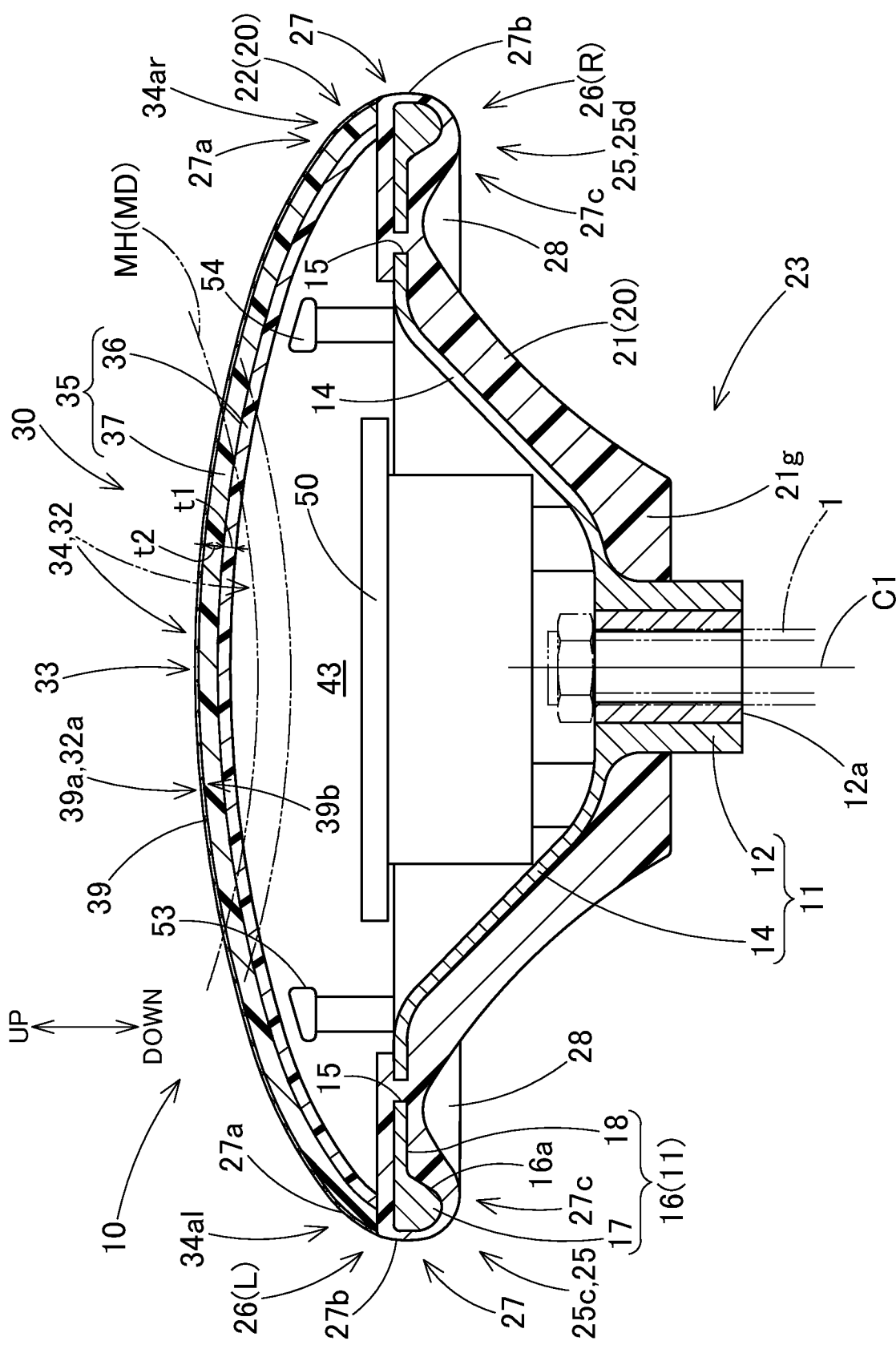
FIG. 6 is a schematic sectional view taken along line VI-VI of FIG. 2.
Figure 10:
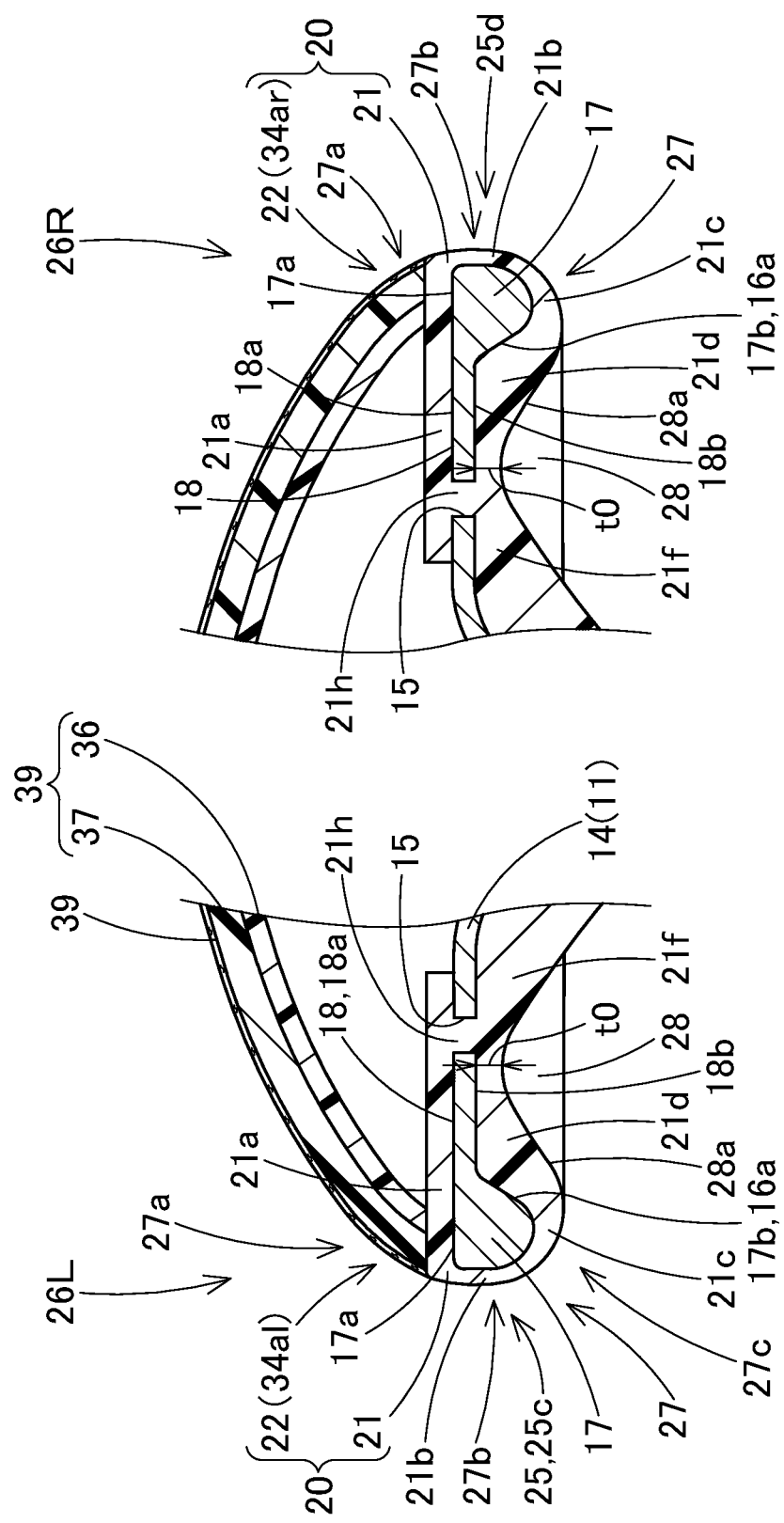
FIG. 10 is an enlarged partial sectional view of the grip portion of the steering wheel of FIG. 1.

The peripheral supporting portion 16 of the supporting member 11 is located in an entire circumference of the outer peripheral portion 25 of the steering wheel 10, and formed into an annular shape. As can be seen in FIGS. 2, 5, 6 and 10, the peripheral supporting portion 16 includes an annular protrusive portion 17 and an annular flat portion 18. The annular protrusive portion 17 protrudes downwardly along the central axis C1 of rotation, and is arranged along an entire circumference of the outer peripheral portion 25. The annular flat portion 18 is disposed in an upper surface 17a of the annular protrusive portion 17, in an entire circumference of the outer peripheral portion 25. The annular flat portion 18 is configured to extend flatly towards the connecting portion 14 in a direction generally orthogonal to the central axis C1 of rotation. As can be seen in FIGS. 5, 6 and 10, a sunken portion 16a is disposed adjoining an inner surface 17b of the annular protrusive portion 17 on an underside 18b of the annular flat portion 18. The sunken portion 16a constitutes, together with a later-described clad body 21 of a clad portion 20, a storing cove portion 28 for receiving fingers (i.e. index finger F1, middle finger F2, ring finger F3 and little finger F4) of the driver MD so that the driver MD is able to grip a later-described grip body 27 of the grip portion 26 smoothly with those fingers and the thumb F0 and thenar eminence DPM as can be seen in FIG. 8.

The connecting portion 14 is formed into such a generally oval plate (more particularly, a generally oval bowl) that connects the boss supporting portion 12 and peripheral supporting portion 16. The connecting portion 14 includes a plurality of through holes 15 going through in an up and down direction. Each of the through holes 15 serves as passage of molding material of the clad body 21 of the clad portion 20 so that the molding material is delivered to an upper side and a lower side of the connecting portion 14. Further, the molding material filled in the through holes 15, namely, filled portions 21h, prevent the clad body 21 from slipping above the peripheral supporting portion 16 and beneath the connecting portion 14.

The supporting member 11 is covered with a clad portion 20 for providing a nice touch feeling. The clad portion 20 includes a clad body 21 which covers the boss supporting portion 12, connecting portion 14 and peripheral supporting portion 16 of the supporting member 11, and an extended cover portion 22 which is located on the clad body 21 in the outer peripheral portion 25. The clad body 21 is formed around the supporting member 11 by injection molding or the like. The extended cover portion 22 is a portion forming an upper surface of the grip portion 26 (26F, 26L, 26R). In this specific embodiment, the extended cover portion 22 is composed of a front edge 34af region, a left edge 34al region, and a right edge 34ar region of a later-described cushion portion 34 which is separate from the clad body 21. When the driver MD grips the grip portion 26 (26F, 26L, 26R), the extended cover portion 22 is located between his hand and peripheral supporting portion 16, and is gripped by him together with the clad body 21. Unlike the supporting member 11 which is hard, the clad body 21 of the clad portion 20 is formed from soft synthetic resin such as urethane or the like to provide a nice feeling. The extended cover portion 22 is also formed from synthetic resin such as urethane or the like which is softer than the supporting member 11.

In this specific embodiment, the clad body 21 of the clad portion 20 is arranged in the boss supporting portion 12 and in a portion of the connecting portion 14 adjoining the boss supporting portion 12 as well, though these portions are not likely to be gripped by the driver MD. Instead of the clad body 21 of the clad portion 20, a lower cover of such synthetic resin as polyamide may be arranged around the boss supporting portion 12 and the portion of the connecting portion 14 adjoining the boss supporting portion 12, especially in an underside of the central portion 30. Such lower cover may be assembled with the supporting member 11.

In the outer peripheral portion 25 of the steering wheel 10, the peripheral supporting portion 16 of the supporting member 11 is covered with the clad portion 20, and the grip portion 26 is arranged in an entire circumference of the outer peripheral portion 25. As best shown in FIG. 6, the grip portion 26 includes a grip body 27 which has a generally round cross-sectional shape with an upper surface 27a facing towards the driver MD, a lower surface 27c, and a generally arcuate outer surface 27b connecting the upper surface 27a and lower surface 27c. The grip portion 26 further includes a storing cove portion 28 which is recessed upwardly, at a side towards the connecting portion 14 in a vicinity of the lower surface 27c of the grip body 27.

As can be seen in FIGS. 5 and 10, in the upper surface 27a of the grip body 27 in a front edge 25a, left edge 25c and right edge 25d of the outer peripheral portion 25, an upper surface portion 21a of the clad body 21 of the clad portion 20 is arranged to cover an upper surface of the annular flat portion 18 of the peripheral supporting portion 16 of the supporting member 11, and the extended cover portion 22 composed of the front edge 34af region, left edge 34al region, and right edge 34ar region of the cushion portion 34 is disposed thereon. In a rear edge 25d of the outer peripheral portion 25, the upper surface portion 21a of the clad body 21, which has an increased thickness, is disposed in the upper surface 27a of the grip body 27. In the outer surface 27b of the grip body 27, an outer surface portion 21b of the clad body 21 is arranged to cover an outward region of the annular flat portion 18 and annular protrusive portion 17 of the peripheral supporting portion 16. In the lower surface 27c of the grip body 27, a lower surface portion 21c of the clad body 21 is arranged to cover an underside of the annular protrusive portion 17. In the storing cove portion 28, an inner surface portion 21d of the clad body 21 is arranged to cover the inner surface 17b of the annular protrusive portion 17 and underside 18b of the annular flat portion 18.

The clad body 21 further includes a lower extended portion 21f which extends from the inner surface portion 21d and covers an underside of the connecting portion 14, and a boss-side portion 21g which extends from the lower extended portion 21f and covers an outer circumference of the boss supporting portion 12. The clad body 21 further includes a plurality of filled portions 21h each of which fills the through hole 15 in the connecting portion 14.

In this specific embodiment, a boundary between the central portion 30 and outer peripheral portion 25 resides in the storing cove portion 28.

The clad portion 20 composed of the clad body 21 and extended cover portion 22 has an Asker C hardness of 30 to 50 so as not to be too soft or too hard so that the driver MD feels nice when gripping the grip portion 26. More particularly, the clad body 21 of the clad portion 20 has an Asker C hardness of approximately 40, and the extended cover portion 22 has an Asker C hardness of approximately 0 because a major part of the extended cover portion 22 constitutes a later-described soft outer layer 37.

The central portion 30 includes a raised portion 32 that protrudes farther upward than the outer peripheral portion 25 along the central axis C1 of rotation. The raised portion 32 includes a cushion portion 34 that is so resilient as to be restorably dentable, in the upper portion 32a. In this specific embodiment, an entirety of the raised portion 32 is composed of the cushion portion 34.

The cushion portion 34 includes a cushion member 35 that includes an inner layer 36 and an outer layer 35 each of which is composed of transparent urethane, silicone or the like. The inner layer 36 of the cushion member 35 is elastically deformable and shape retentive. The outer layer 37 is softer than the inner layer 36, and has a softness approximate to that of human skin. In this specific embodiment, a thickness t1 of the inner layer 36 is approximately 2 mm, and a thickness t2 of the outer layer 37 is approximately 15 mm. The inner layer 36 has a Shore A hardness of approximately 35, and the outer layer 37 has an Asker C hardness of approximately 0.

In this specific embodiment, the cushion portion 34 composed of the cushion member 35 is formed into a bowl shape which interiorly has a void space 43 which has air communication with the atmosphere via a not-shown communication hole. A sheet member 39 composed of a fabric such as woven fabric, non-woven material or the like is adhered to an outer surface of the cushion portion 34 to provide a soft feeling. More particularly, the sheet member 39 is composed of a fabric which could be used as a pillow cover, upholstery fabric or the like so the face of the driver MD feels nice. The sheet member 39 has such a degree of light transparency that allows an image GF projected on the back surface 39b by a later-described projection device 50 to be visible from the front surface 39a.

The cushion portion 34 (or raised portion 32) of this specific embodiment is configured to rise in the shape of a generally halved prolate spheroid from the outer surface 27b of the grip body 27 of the grip portion 26 in the outer peripheral portion 25. A top 33 of the cushion portion 34 (or raised portion 32) is slightly dislocated forward from the central axis C1 of rotation of the boss supporting portion 12a of the boss section 23. The cushion portion 34 upheaves gently in a curved fashion, and its lower end is fixed to an upper surface of the clad body 21.

Figure 2:
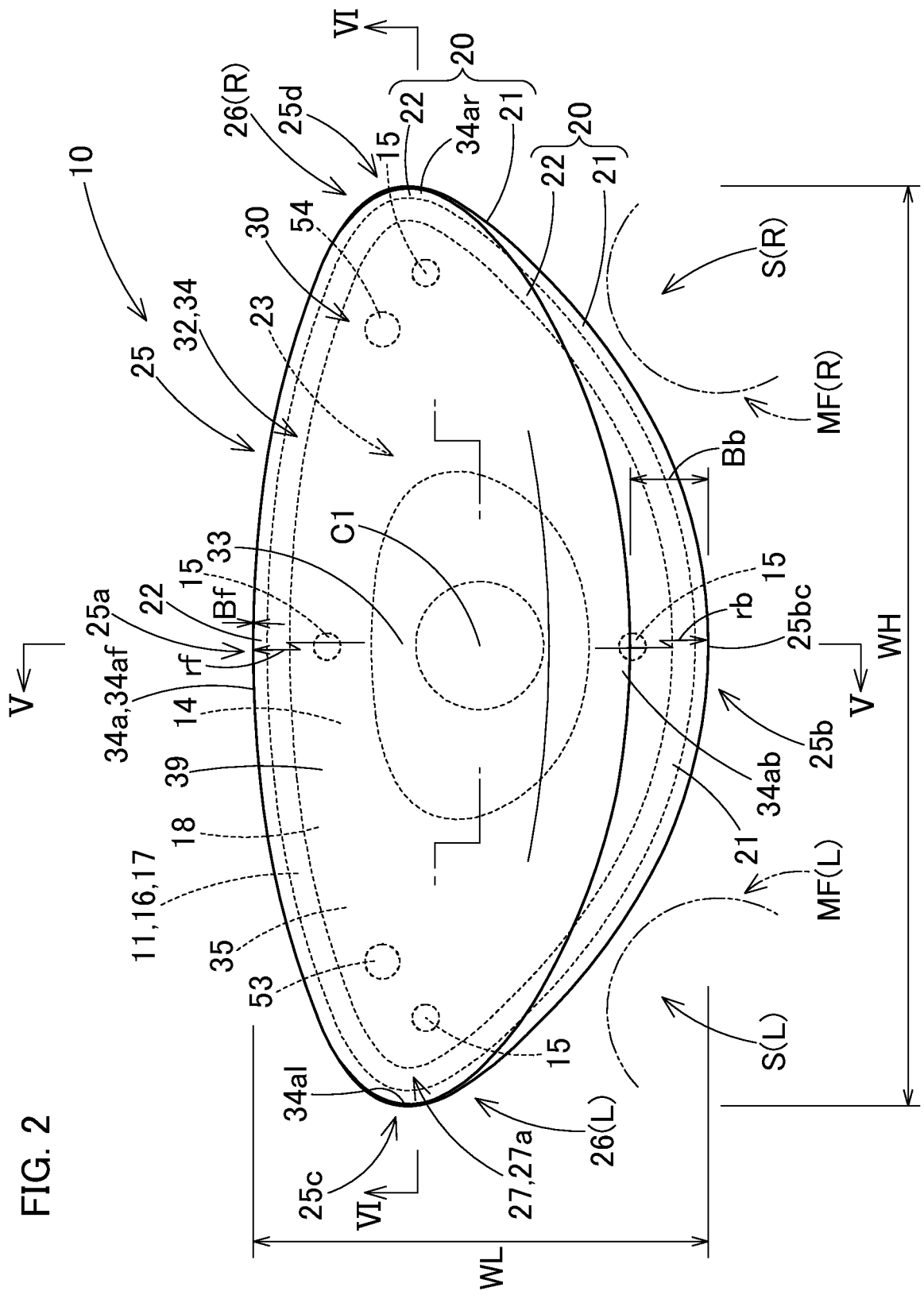
FIG. 2 is a plan view of the steering wheel of FIG. 1.

As can be seen in FIG. 2, the outer peripheral portion 25 of this specific embodiment has a generally oval shape in which the width WL in a front and back direction is smaller than the width WH in a left and right direction, as viewed from above. Especially, as viewed from above, the outer peripheral portion 25 has such a curved oval shape that an outer shape of the front edge 25a has a greater curvature radius than that of the rear edge 25b. That is, a curvature radius rf of the front edge 25a is greater than a curvature radius rb of the rear edge 25b. In this specific embodiment, the width WH in the left and right direction of the outer peripheral portion 25 is approximately 380 mm, and the width WL in the front and back direction is approximately 200 mm.

Figure 3:
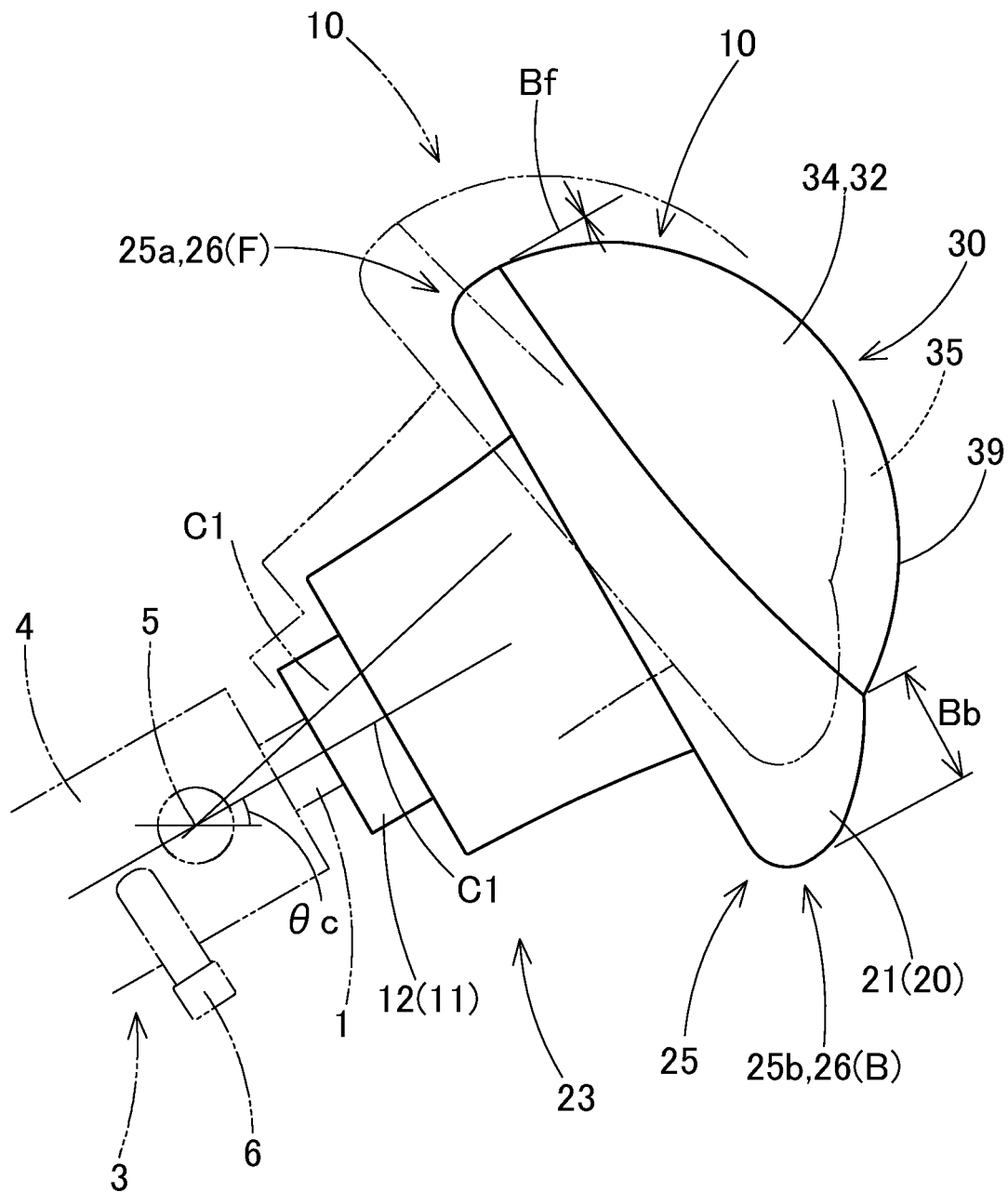
FIG. 3 is a side view of the steering wheel of FIG. 1.

The raised portion 32 located in an inner side of the outer peripheral portion 25 also has a generally oval shape in which the width in the front and back direction is smaller than the width in the left and right direction, as viewed from above. Especially, as can be seen in FIGS. 2 and 3, the raised portion 32 is configured such that a width Bb in the front and back direction of the rear edge 25b portion of the outer peripheral portion 25 as viewed from above is greater than a width Bf in the front and back direction of the front edge 25a portion of the outer peripheral portion 25 as viewed from above. In this specific embodiment, the width Bf of the front edge 25a portion of the outer peripheral portion 25 as viewed from above is almost 0.

A projection device 50 is disposed inside of the central portion 30 covered with the cushion portion 34. The projection device 50 is supported by the supporting member 11. The projection device 50 is designed to project predetermined images GF (as indicated with dashed-and-double-dotted lines in FIG. 2) on the back surface 39b of the sheet member 39 via the transparent cushion portion 34. In this specific embodiment, the projection device 50 is configured to project such images GF as time indication, relaxing moving images or the like on the back surface 39b of the sheet member 39, using a LED matrix panel.

Operating switches 53, 54 are disposed at left and right end portions of and beneath the cushion portion 34 for actuating a horn and operating an audio device, as can be seen in FIGS. 2 and 6. The operating switches 53, 54 are configured to be operated by pressing.

Figure 8A:
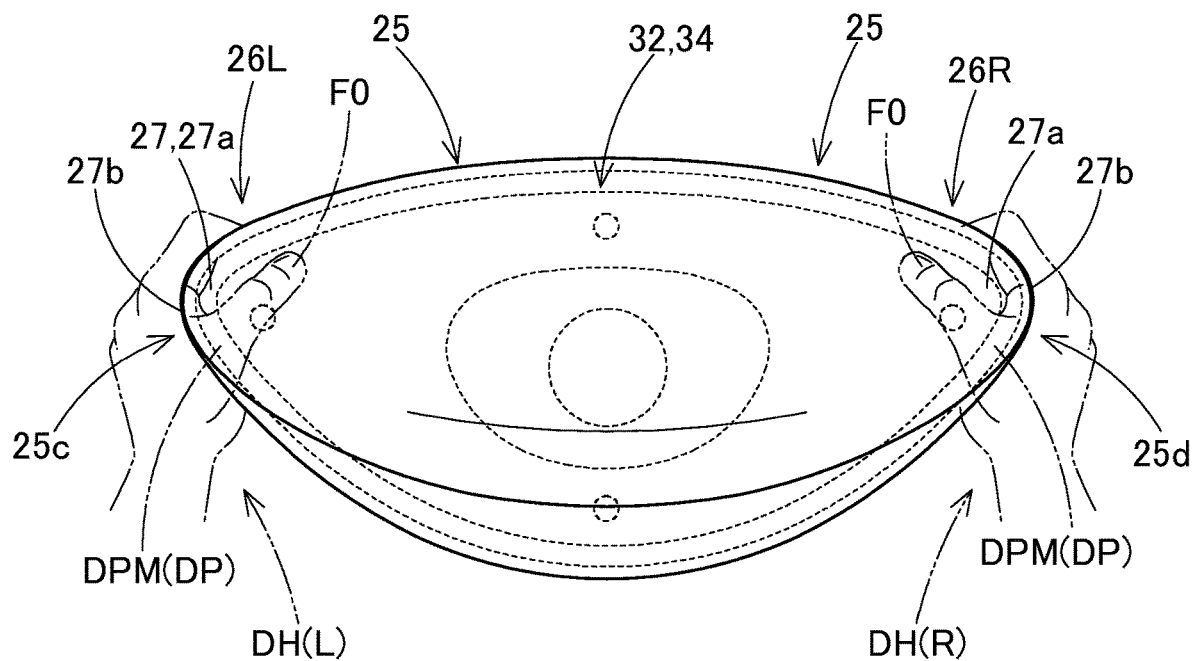
FIG. 8A depicts, from above, the way the driver grips a grip portion of the steering wheel of FIG. 1.
Figure 8B:
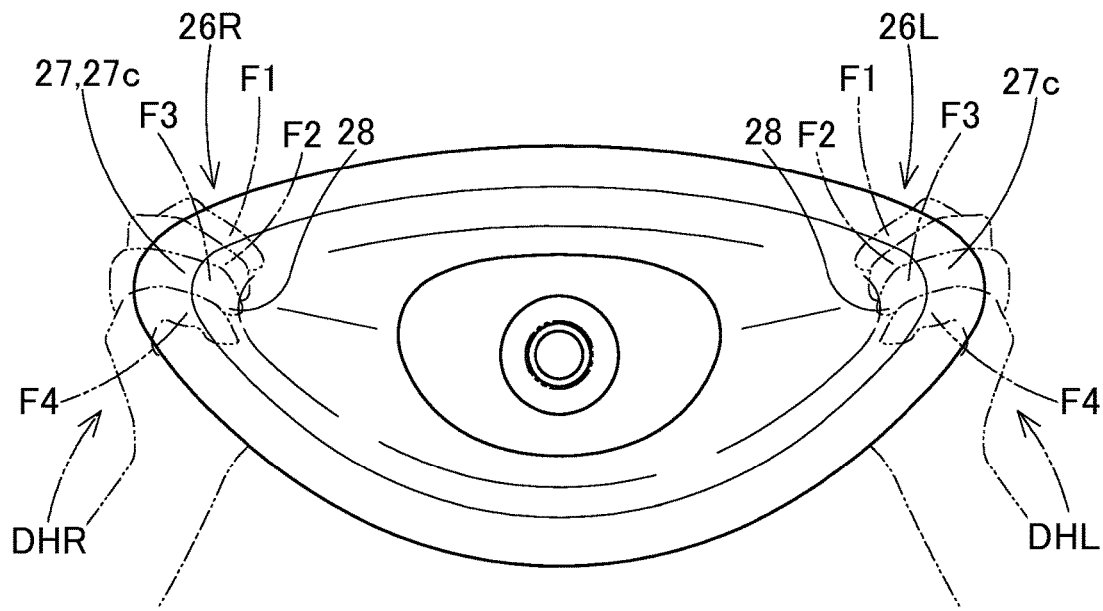
FIG. 8B depicts, from below, the way the driver grips the grip portion of the steering wheel of FIG. 1.
Figure 9A:
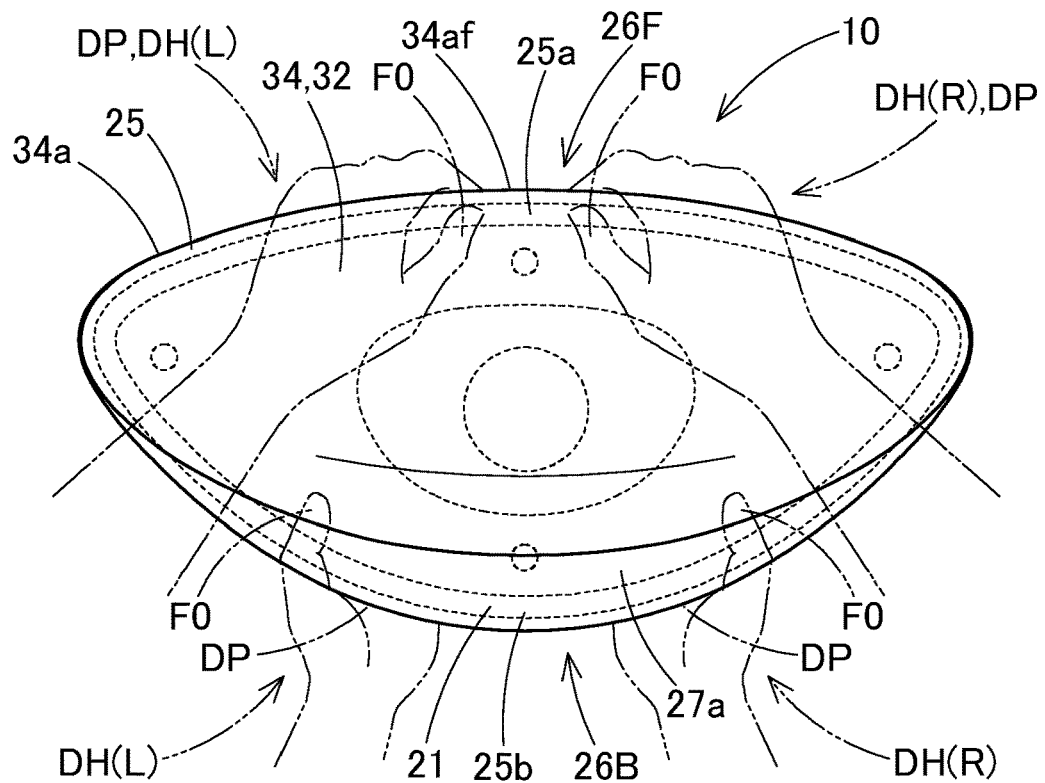
FIG. 9A depicts, from above, the way the driver grips front and rear portions of the grip portion of the steering wheel of FIG. 1.
Figure 9B:
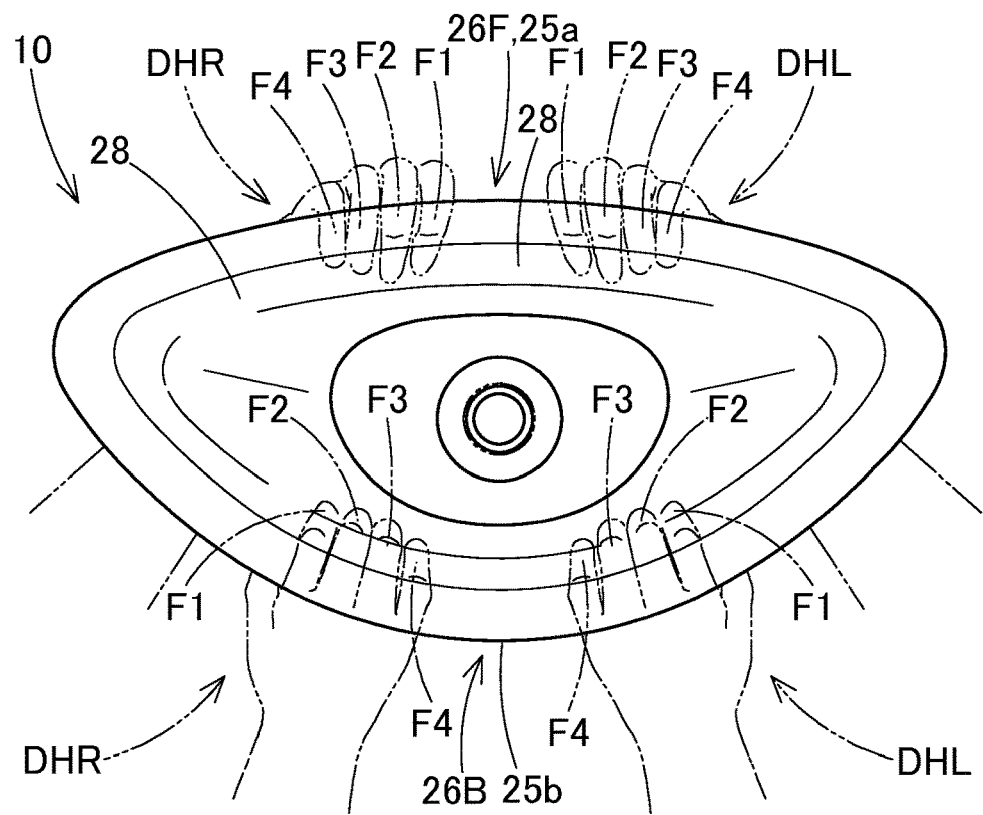
FIG. 9B depicts, from below, the way the driver grips the front and rear portions of the grip portion of the steering wheel of FIG. 1.

For steering operation, if the driver MD places his/her thumbs F0 and thenar eminences DPM of left and right hands DH(L), DH(R) on the upper surface 27a of the grip portion 26L, 26R in, for example, the left and right edge 25c, 25d portions of the outer peripheral portion 25 as can be seen in FIGS. 8A and 8B, and bends his fingers (i.e. index fingers F1, middle fingers F2, ring fingers F3 and little fingers F4), he/she is able to hold a region of the grip body 27 from the outer surface 27b to the storing cove portion 28 via the lower surface 27c, and rotate the steering wheel 10 easily.

If the driver MD puts his head MH on the upper surface 32a of the raised portion 32 of the central portion 30 as indicated with dashed-and-double-dotted lines in FIGS. 5 and 6, his head MH is softly supported by the raised portion 32 which includes the cushion portion 34 having resiliency. Thus, the driver MD is able to use the raised portion 32 as a pillow. Especially, as can be seen in FIGS. 2, 5 and 6, the central portion 30 with the raised portion 32 is configured to lid an entire region located inward of the outer peripheral portion 25 including a region above the boss section 23 around the central axis C1 of rotation. That is, the central portion 30 does not include any openings going through in an up and down direction. Therefore, the central portion 30 is able to support the head MH of the driver MD with the upper surface 32a of the raised portion 32, and the driver MD is able to use the raised portion 32 as a pillow comfortably. Further, the raised portion 32 of the central portion 30 is ready for use as a pillow instantly with no complicated attaching work since it is disposed in the steering wheel 10 itself, inside of the outer peripheral portion 25. Of course, the driver MD is able to operate the steering wheel 10 smoothly by holding the grip portion 26 which is located in the outer peripheral portion 25 disposed in the circumference of the raised portion 32.

Therefore, the steering wheel 10 in accordance with the exemplary embodiment is able to be used as a pillow to take a rest with no complicated attaching procedure, and is also able to be used for smooth driving.

In the steering wheel 10 in accordance with the exemplary embodiment, the sheet member 39 composed of a fabric is disposed on the outer surface of the cushion portion 34.

Since the sheet member 39 disposed on the outer surface of the cushion portion 34 provides a nice feeling against the face or the like of the driver MD, the raised portion 32 with the cushion portion 34 can be further suitably used as a pillow.

When the steering wheel 10 in accordance with the exemplary embodiment is viewed from above, each of the outer peripheral portion 25 and the raised portion 32 located in an inner side of the outer peripheral portion 25 has a generally oval shape in which the width WL in the front and back direction is smaller than the width WH in the left and right direction, as can be seen in FIG. 2.

Figure 7:
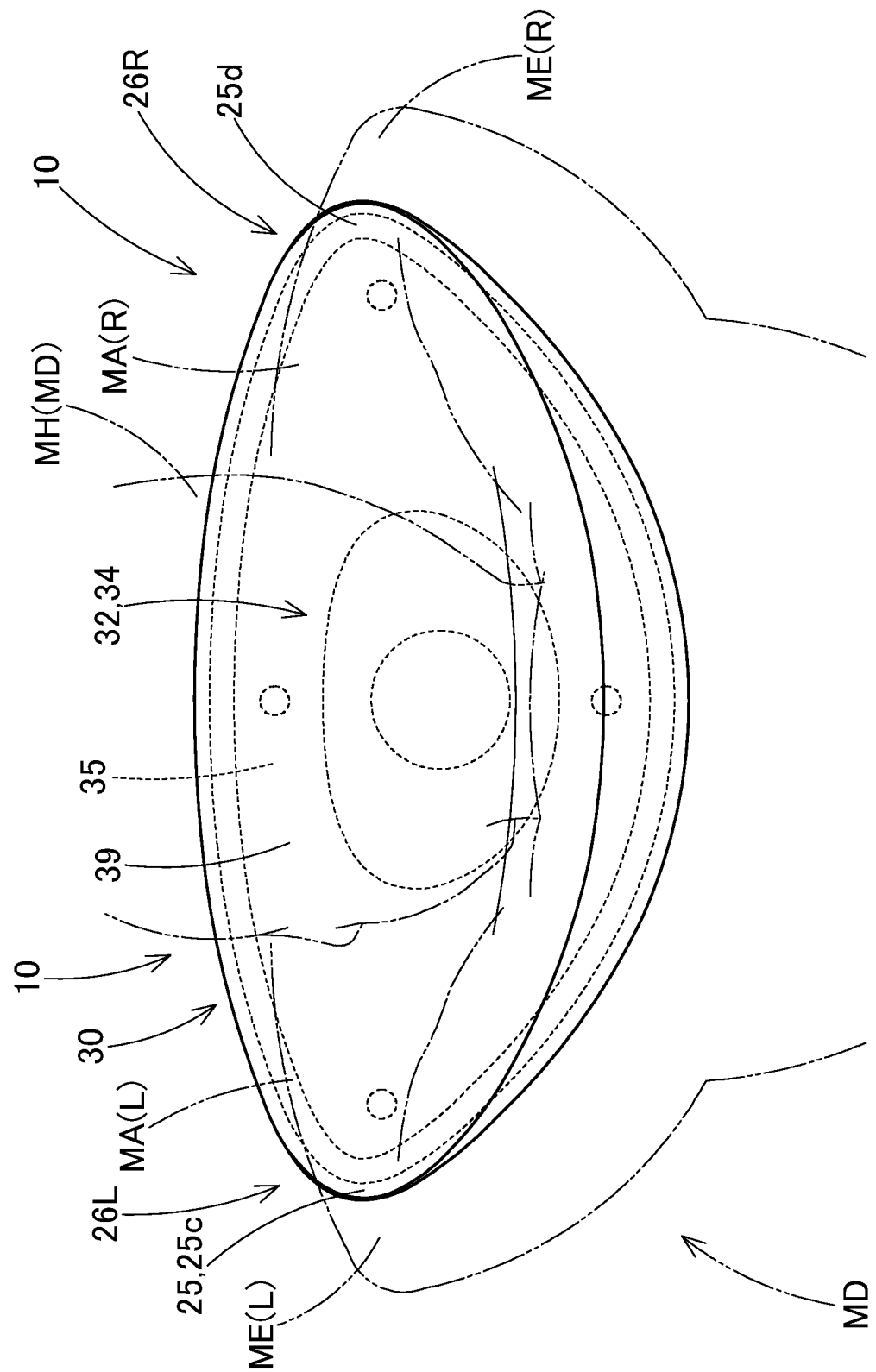
FIG. 7 illustrates the way a driver folds his arms on a raised portion of the steering wheel and rests thereon.

With this configuration, the steering wheel 10 has a reduced width WL in the front and back direction while has an enough width WH for holding and operating in the left and right direction. Thus, as can be seen in FIG. 7, the driver MD will be able to place his left and right elbows ME(L), ME(R) on the upper surface 32a of the raised portion 32 in vicinities of the left edge 25c and right edge 25d, cross his arms MA(L), MA(R) and put his head MH on the arms MA(L), MA(R) so that he can take a rest with his upper body including the head MH leaned against the steering wheel 10. The reduced with ML in the front and back direction will prevent the rear edge 25b portion of the outer peripheral portion 25 from being brought into engagement with thighs MF(L), MF(R) of the driver MD. By way of example, when the driver MD reclines the seat, the rear edge 25b portion of the outer peripheral portion 25 of the steering wheel 10 will not be likely to engage with the thighs MF(L), MF(R) of the driver MD as indicated with dashed-and-double-dotted lines in FIG. 2, so that a degree of freedom of posture of the driver MD at rest will be secured.

Figure 4:
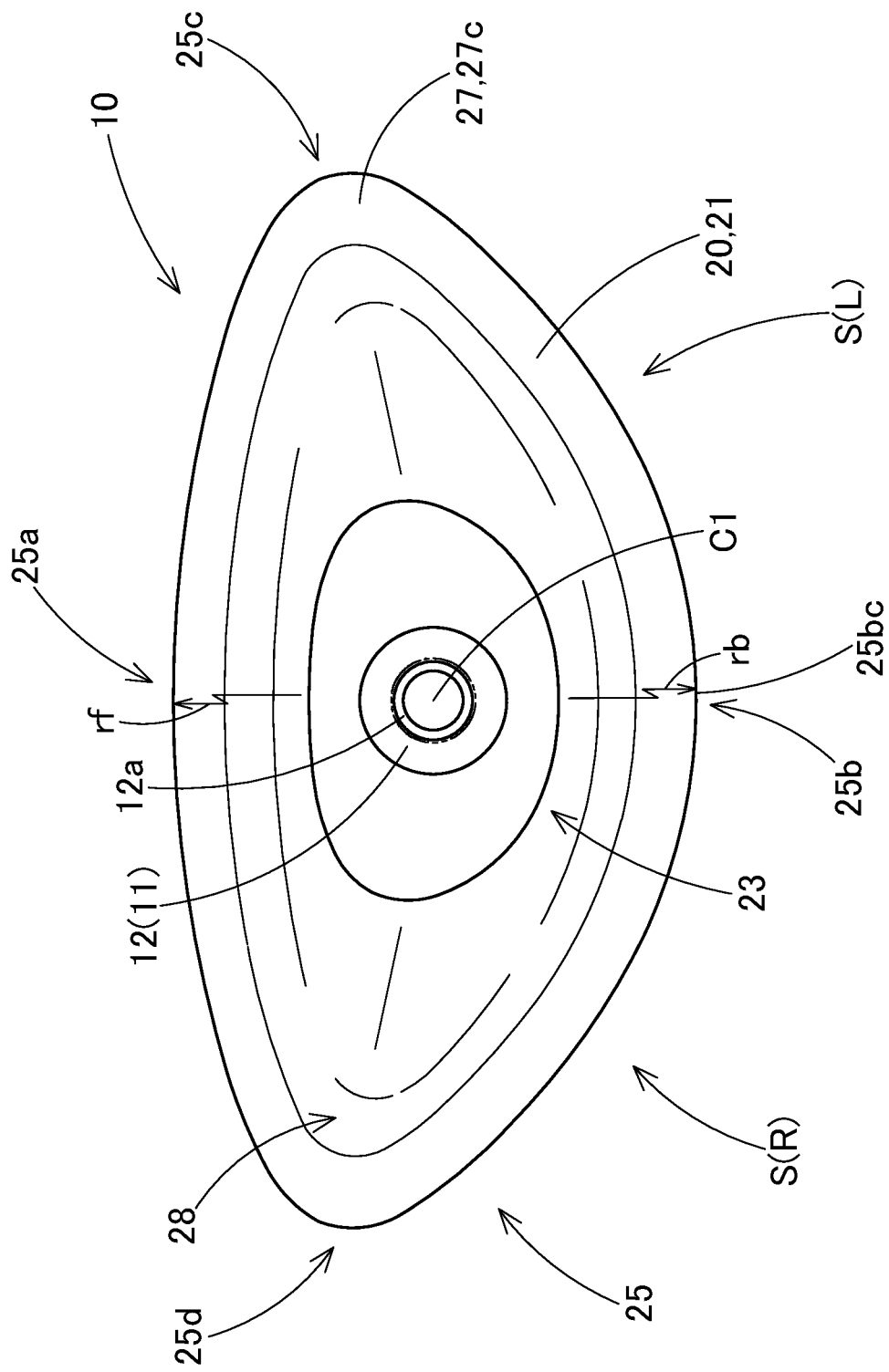
FIG. 4 is a bottom view of the steering wheel of FIG. 1.

In the steering wheel 10 in accordance with the exemplary embodiment, especially, the outer peripheral portion 25 as viewed from above has such a curved shape that the outer shape of the front edge 25a has a greater curvature radius rf than a curvature radius rb of the rear edge 25b, as can be seen in FIGS. 2 and 4.

That is, the rear edge 25b of the outer peripheral portion 25 has such a shape that curves forward sharply towards the left and right ends 25c, 25d, which provides spaces S(L), S(R) in the left and right sides of a rear end 25bc of the outer peripheral portion 25, i.e. in front of the left and right thighs MF(L), MF(R) of the driver MD as sat in the seat. Therefore, the rear edge 25b portion of the outer peripheral portion 25 will be further unlikely to engage with the thighs MF(L), MF(R) of the driver MD, so that the degree of freedom of posture of the driver MD at rest will be further secured.

In the steering wheel 10 in accordance with the exemplary embodiment, moreover, the grip portion 26 is disposed in the entire circumference of the outer peripheral portion 25, and the raised portion 32 of the central portion 30 is disposed inside of the outer peripheral portion 25 such that the width Bb in the front and back direction of the rear edge 25b portion of the outer peripheral portion 25 as viewed from above is greater than the width Bf in the front and back direction of the front edge 25a portion of the outer peripheral portion 25 as viewed from above, as can be seen in FIGS. 2 and 3.

With this configuration, although the width Bf of the front edge 25a portion of the outer peripheral portion 25 is small, the driver MD is able to hold a grip portion 26F in the front edge 25a portion of the outer peripheral portion 25 easily by turning his/her palm DP(L), DP(R) downward, placing the same on the grip portion 26F in the front edge 25a portion, and bending the fingers (i.e. index finger F1, middle finger F2, ring finger F3 and little finger F4). The driver MD is also able to hold a grip portion 26B in the rear edge 25b portion by turning his/her palm DP(L), DP(R) upward and holding the grip portion 26B in a wrapping fashion. The driver MD is able to hold the grip portion 26B more steadily if he/she places his/her thumb F0 on the upper surface 27a of the grip portion 26B since the rear edge 25b portion of the outer peripheral portion 25 has a great width Bb and provides a sufficient space for receiving the thumb F0.

In the steering wheel 10 in accordance with the exemplary embodiment, moreover, the cushion portion 34 of the central portion 30 is composed of a resilient material, i.e. cushion member 35, that has a bowl shape which interiorly has a void space 43, and the bowl shape forms the raised shape of the raised portion 32.

The cushion member 35 as the resilient material provides the resiliency to the cushion portion 34. Unlike an instance where the cushion portion is formed like a rubber ball which interiorly has a closed space, the cushion portion 34 in the exemplary embodiment will not be affected by the temperature of a vehicle interior, and has a steady resiliency.

In the steering wheel 10 in accordance with the exemplary embodiment, furthermore, the projection device 50 is located inside of the central portion 30. The projection device 50 is configured to project a predetermined image GF on the back side of the cushion portion 34. The sheet member 39 disposed on the outer surface 32a of the raised portion 32 is configured to allow the image GF projected by the projection device 50 to be visible from the outside 39a of the sheet member 39.

The steering wheel 10 with this configuration is able to indicate the images GF which have been projected by the projection device 50 on the upper surface 32a of the raised portion 32, as indicated with dashed-and-double-dotted lines in FIG. 1. This way the steering wheel 10 is able to transmit information to the driver MD and is also improved in appearance.

Other than the time indication as shown in FIG. 1, relaxing moving images may also be indicated in the raised portion 32.

Figure 11A:
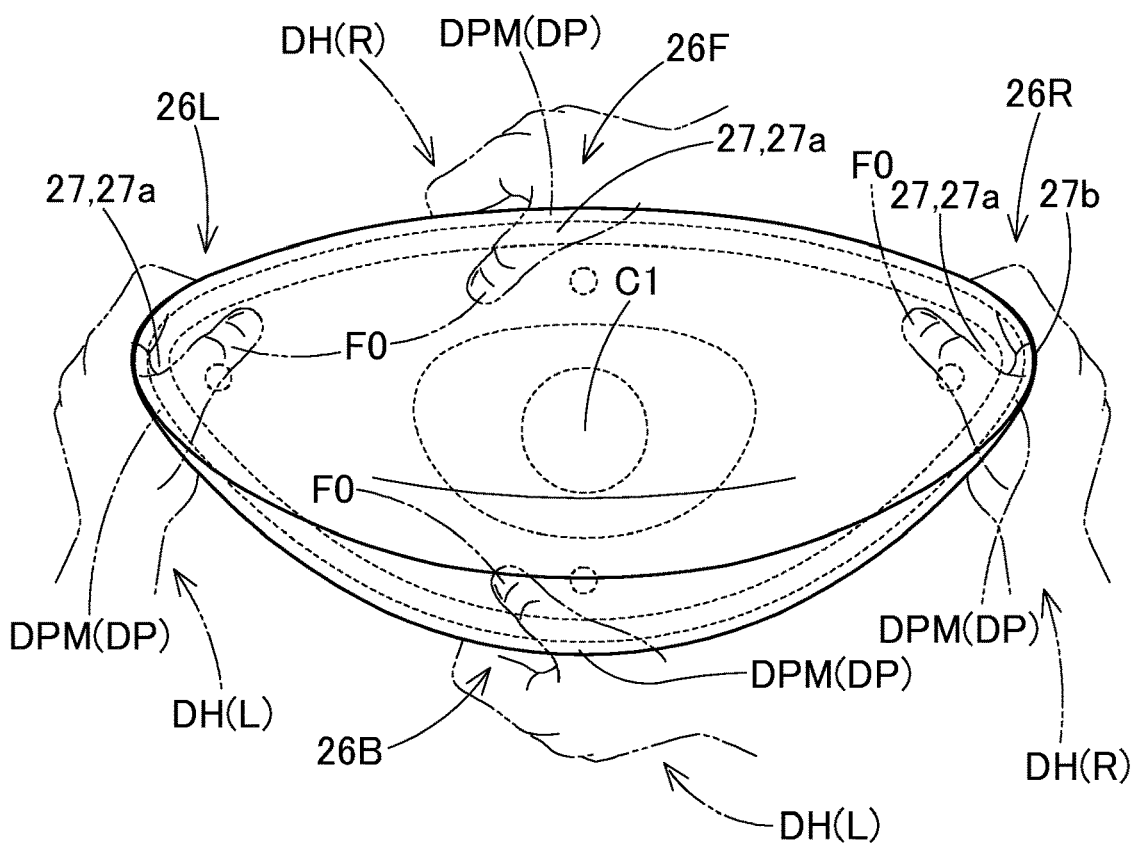
FIG. 11A depicts, from above, the way the driver grips the grip portion of the steering wheel of FIG. 1.
Figure 11B:
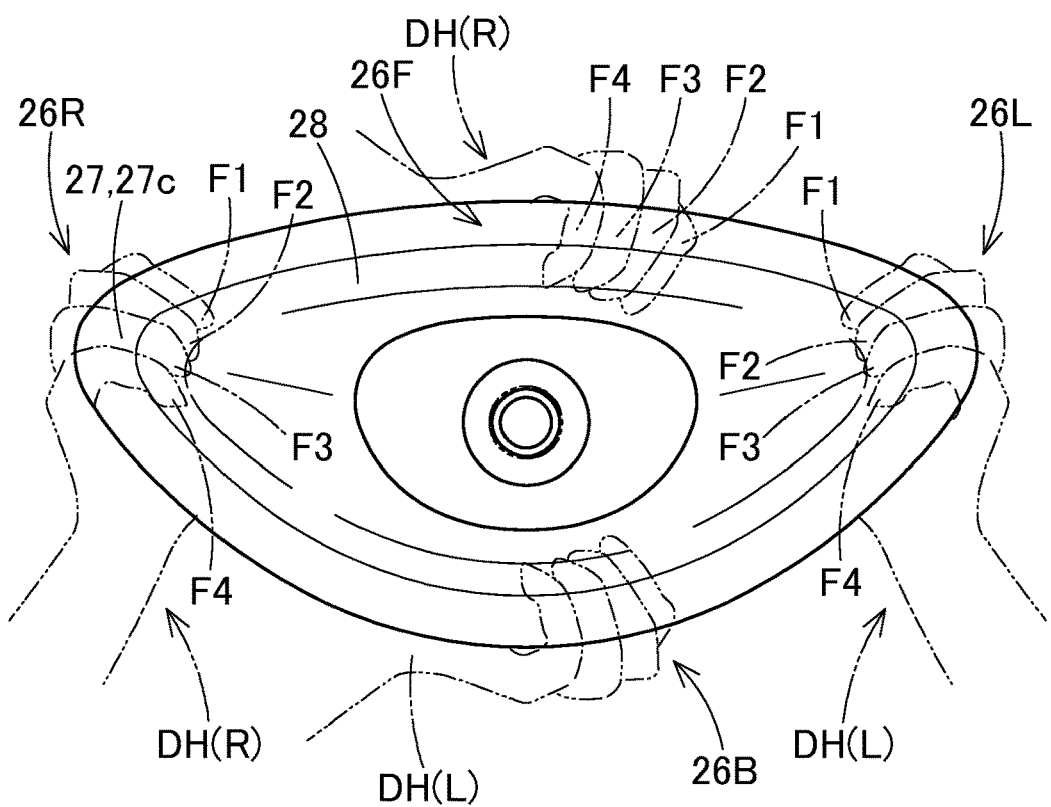
FIG. 11B depicts, from below, the way the driver grips the grip portion of the steering wheel of FIG. 1.
Figure 12:
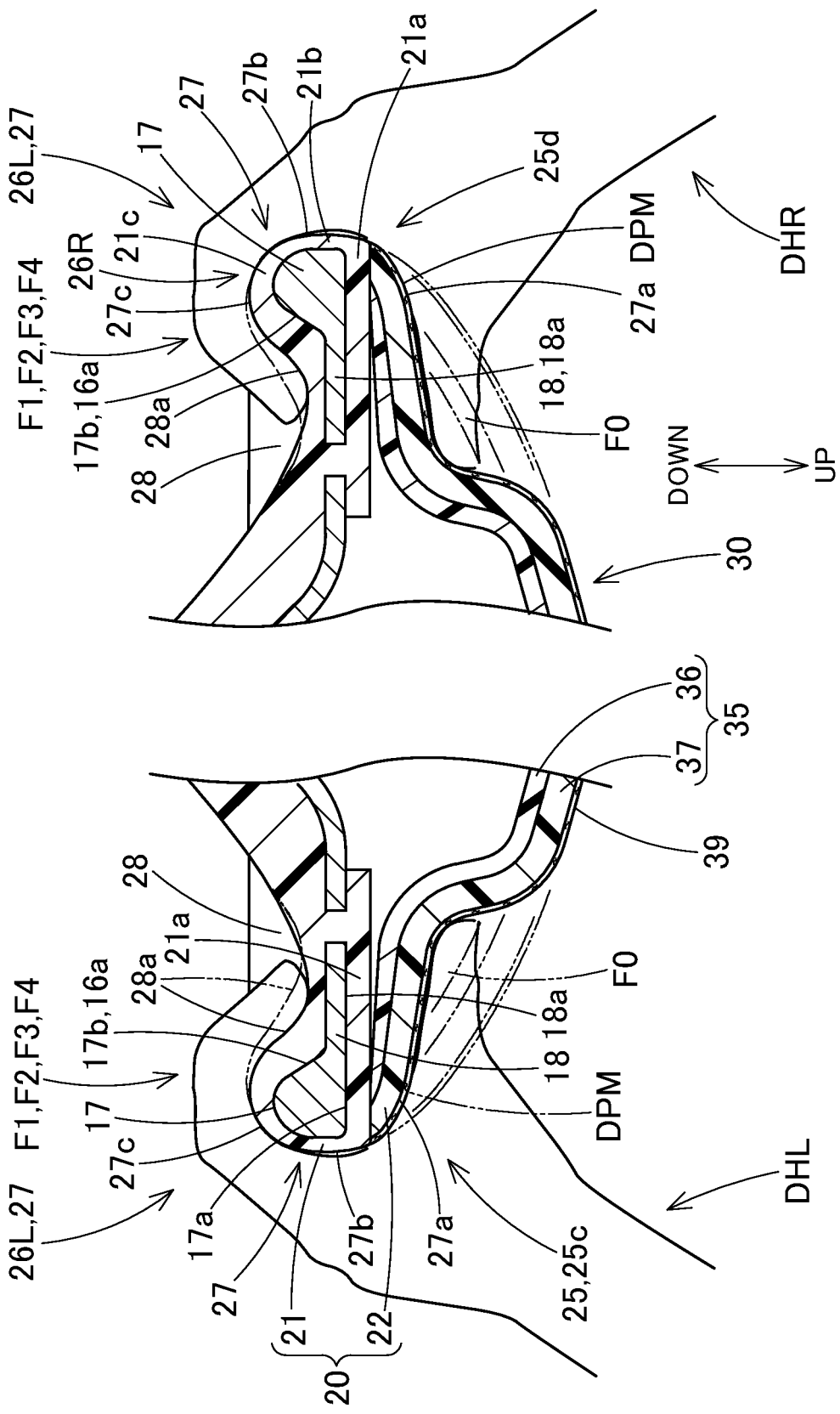
FIG. 12 is a schematic partial sectional view depicting the way the driver grips the grip portion.
Figure 13:
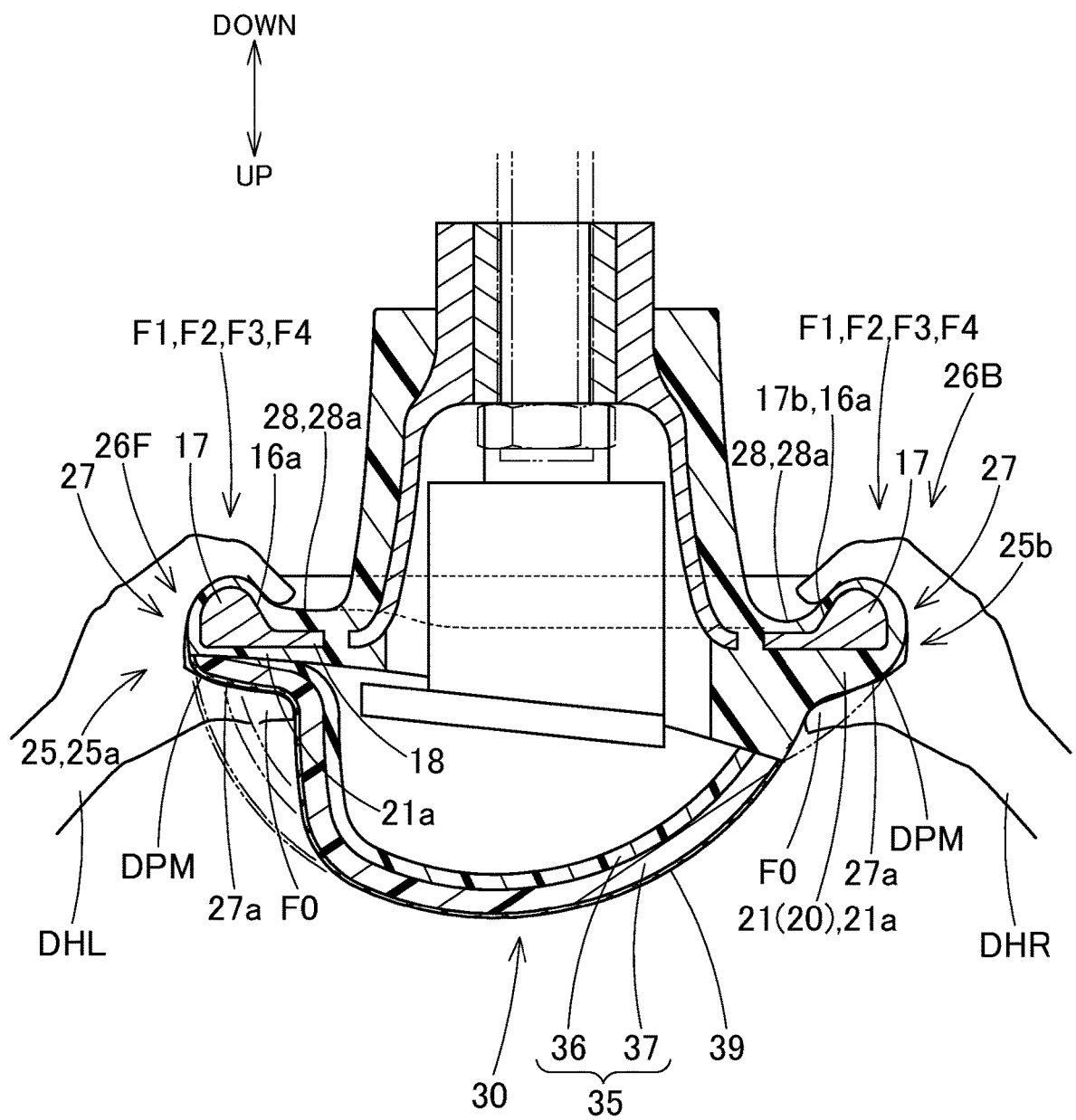
FIG. 13 is a schematic sectional view depicting the way the driver grips the front and rear portions of the grip portion.

In the steering wheel 10 in accordance with the exemplary embodiment, as can be seen in FIGS. 11 to 13, when the driver MD grips the grip body 27 of the grip portion 26 (26F, 26B, 26L, 26R), he/she places his/her thumb F0 and thenar eminence DPM of his/her hand DH(L), DH(R) on the upper surface 27a of the grip body 27, bends his/her index fingers F1, middle fingers F2, ring fingers F3 and little fingers F4 and places the same on the lower surface 27c of the grip body 27. In the grip portion 26 (26F, 26B, 26L, 26R), the peripheral supporting portion 16 of the supporting member 11 includes the annular flat portion 18 extending from the connecting portion 14 (or from the boss section 23), the annular protrusive portion 17 protruding downwardly in the underside 18b of the annular flat portion 18, and the sunken portion 16a disposed adjoining the inner surface 17b of the annular protrusive portion 17 in the underside 18b of the annular flat portion 18. The peripheral supporting portion 16 is clad in the soft clad portion 20 and forms the grip body 27 having a nice grip feeling. That is, since a flat portion 18a of the annular flat portion 18 of the rigid supporting member 11 extends to a vicinity of the connecting portion 14 inside the upper surface 27a of the grip body 27, the driver MD is able to push his/her thumb F0 and thenar eminence DPM against the flat portion 18a of the annular flat portion 18 by elastically deforming the soft clad portion 20 disposed in the upper surface 27a of the grip body 27, while the nice feeling is retained. More particularly, referring to FIGS. 11 to 13, when the front edge 25a portion, left edge 25c portion, or right edge 25d portions of the outer peripheral portion 25 is gripped, the upper surface portion 21a of the clad body 21 and the extended cover portion 22 are elastically deformed, and when the rear edge 25b portion of the outer peripheral portion 25 is gripped, the upper surface portion 21a of the clad body 21 is elastically deformed, and the thumb F0 and thenar eminence DPM of the driver MD are pushed against the flat portion 18a of the annular flat portion 18 while the nice feeling is retained. Further, in the lower surface 27c of the grip body 27, the driver MD is able to grip the lower surface 27c of the grip body 27 with his/her index finger F1, middle finger F2, ring finger F3 and little finger F4 while elastically deforming the lower surface portion 21c and inner surface portion 21d of the clad body 21 including an convex surface 28a of the storing cove portion 28, in the entire circumference of the outer peripheral portion 25. As a consequence, although not provided with an opening for receiving the thumb F0, the grip body 27 in a vicinity of the annular protrusive portion 17 can be held adequately and operated steadily.

Therefore, the steering wheel 10 in accordance with the exemplary embodiment is easy to rotate for steering and provides a good grip feeling although it is not provided with an opening for receiving driver's thumbs in a region between the boss section 23 and the outer peripheral portion 25 to be held for steering.

The steering wheel 10 in accordance with the exemplary embodiment includes the storing cove portion 28 originally. That is, in the underside of the grip portion 26, the clad portion 20 has such a thickness t0 that makes the storing cove portion 28 recessed farther upward than the lower surface portion 27c of the grip body 27 in a vicinity of the annular protrusive portion 17 of the peripheral supporting portion 16 of the supporting member 11.

In this case, if the clad portion 20 has an Asker C hardness of 30 to 50, the grip portion 26 has a nice grip feeling which is not too soft or too hard. In the exemplary embodiment, more particularly, the clad body 21 of the clad portion 20 has an Asker C hardness of approximately 40, and the extended cover portion 22 has an Asker C hardness of approximately 0.

Figure 14:
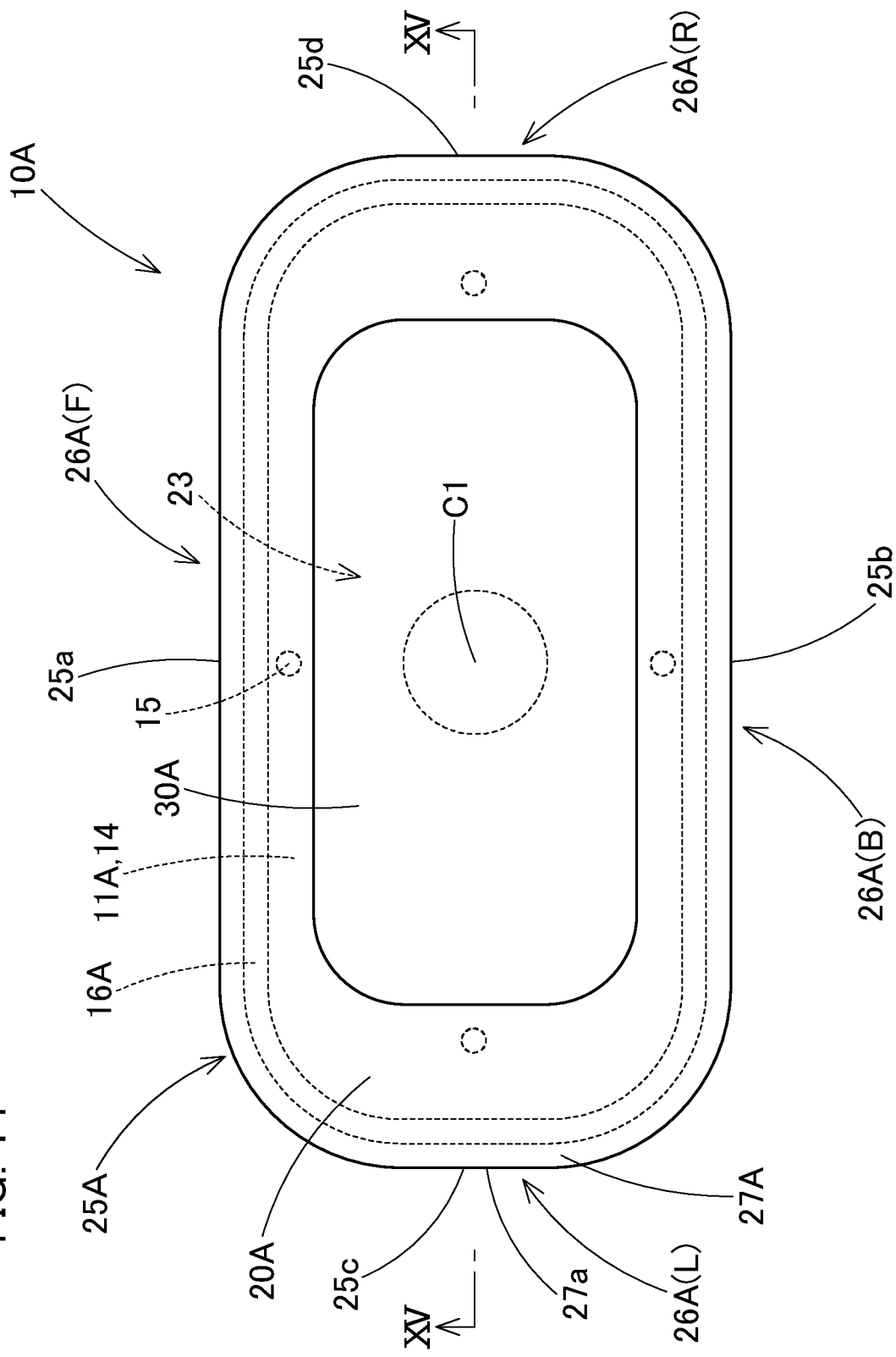
FIG. 14 is a plan view of a steering wheel in accordance with an alternative embodiment.
Figure 15:
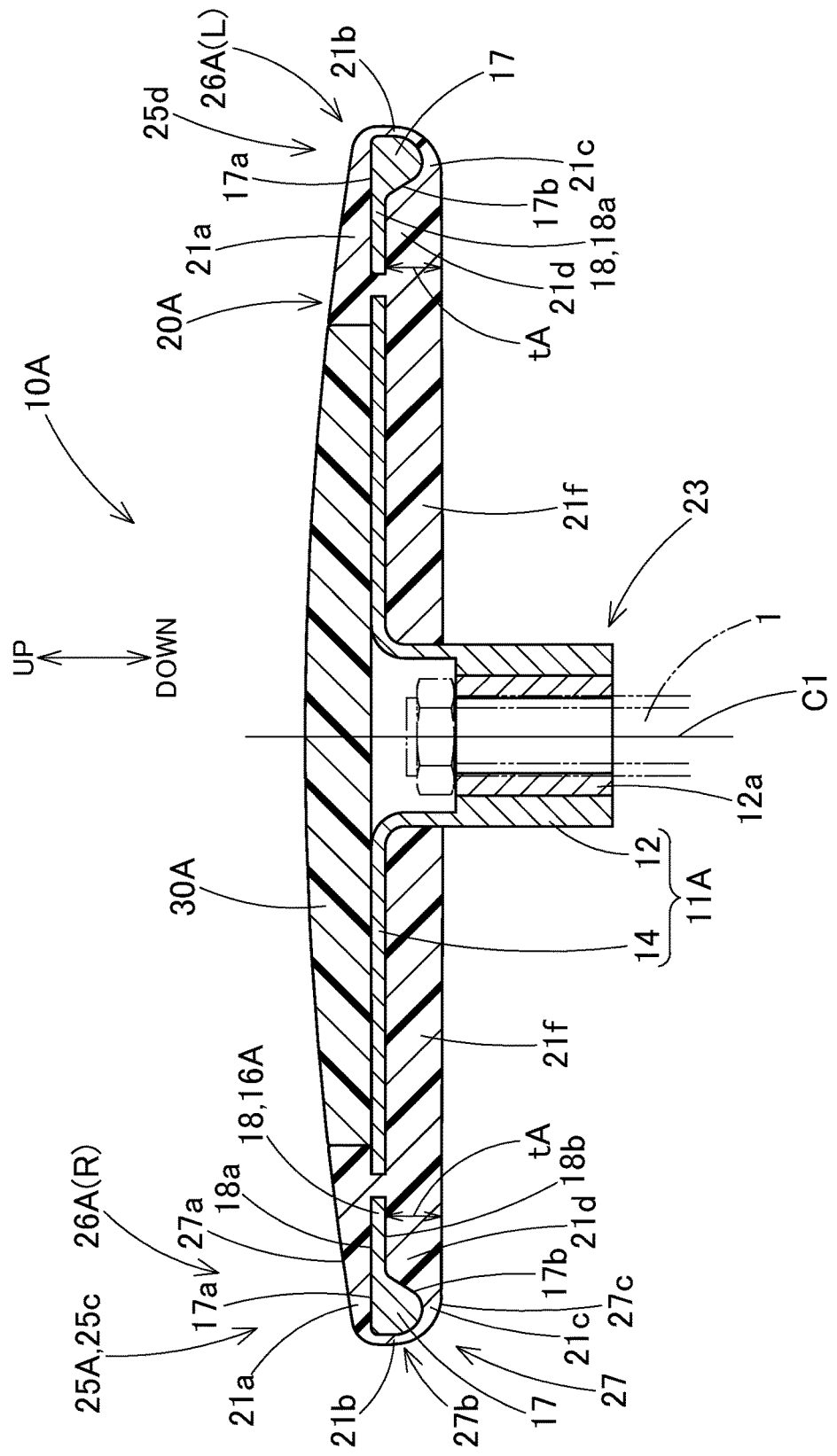
FIG. 15 is a schematic sectional view of the steering wheel of FIG. 14 taken along line XV-XV.
Figure 16:
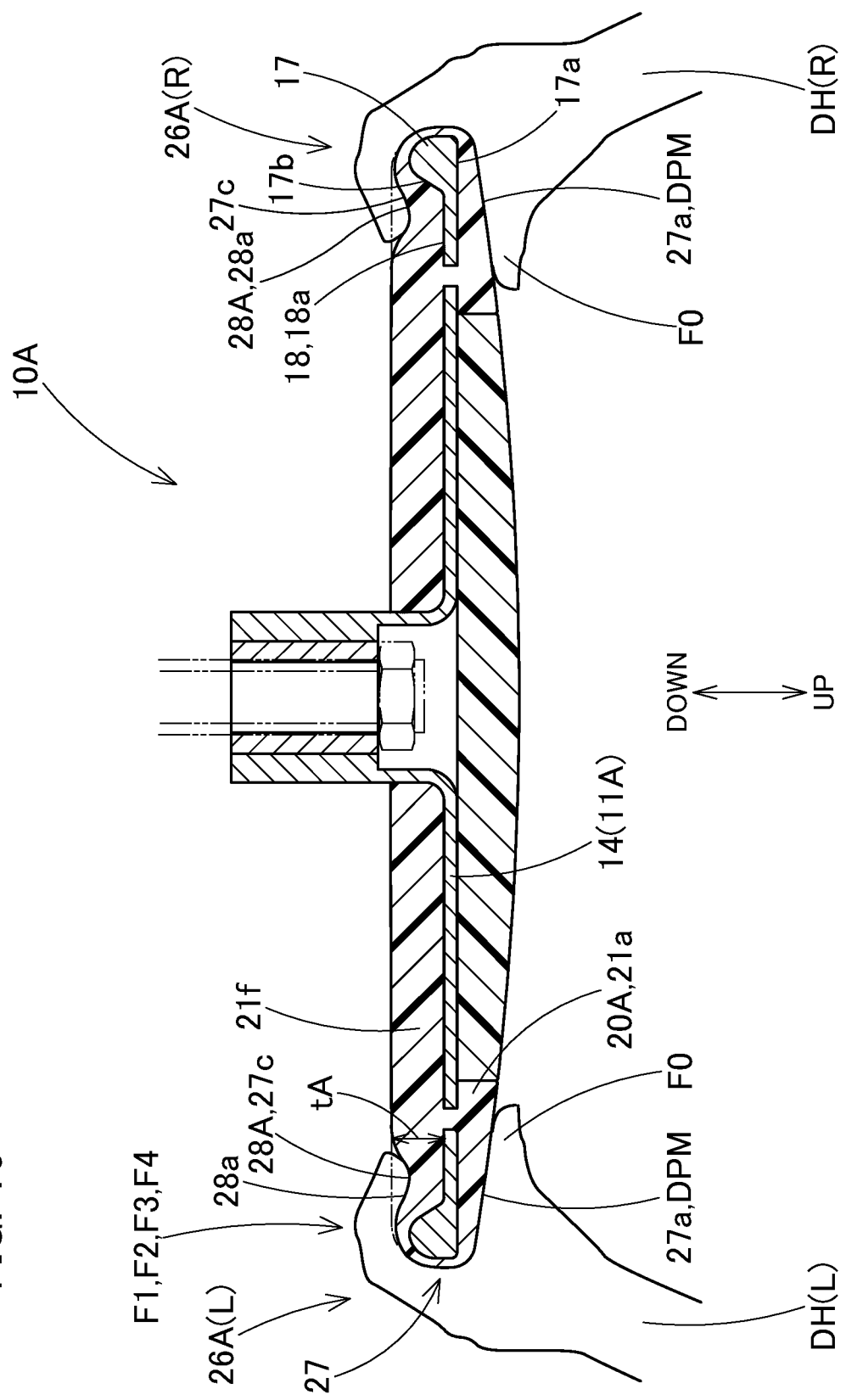
FIG. 16 is a schematic sectional view depicting the way the driver grips a grip portion of the steering wheel of FIG. 14.

Alternatively, the storing cove portion 28 may be formed when the driver MD holds the grip portion 26, as in a steering wheel 10A depicted in FIGS. 14 to 16. In an underside of the outer peripheral portion 25A of the steering wheel 10A, a clad portion 20A is configured to have such a thickness that makes a region from a lower surface 27c of the grip body 27A to a vicinity of the connecting portion 14 via the storing cove portion 28A generally flat, and the clad portion 20A is configured to have such a hardness that allows the clad portion 20A to be elastically deformed for forming a storing cove portion 28A when held by the driver.

In a similar fashion to the steering wheel 10 of the foregoing embodiment, the steering wheel 10A includes a boss section 23 which is disposed in a lower portion of the steering wheel 10A and in a vicinity of a central axis C1 of rotation, an outer peripheral portion 25A which is disposed in an outer edge of the steering wheel 10A in a direction orthogonal to the central axis C1 of rotation in a circumference of the boss section 23, and a central portion 30A which covers an entirety of a region disposed farther towards the boss section 23 than the outer peripheral portion 25A including a region disposed above the boss section 23. The outer peripheral portion 25A includes a grip portion 26A to be gripped by a driver for steering operation. However, the outer peripheral portion 25A has a generally rectangular outer shape as viewed from above. The steering wheel 10A interiorly includes a supporting member 11A that is formed from metal or synthetic resin having rigidity and forms a skeleton of the steering wheel 10A. The supporting member 11A includes a boss supporting portion 12 located in the boss section 23, a peripheral supporting portion 16A located in the outer peripheral portion 25A, and a connecting portion 14 which is located in the central portion 30A and connects the boss supporting portion 12 and peripheral supporting portion 16A.

The peripheral supporting portion 16A, the connecting portion 14 and the boss supporting portion 12 of the supporting member 11A are covered with a clad portion 20A which is composed of urethane or the like softer than the supporting member 11A.

Similarly to the steering wheel 10 of the foregoing embodiment, the grip portion 26A is formed in an entire circumference of the outer peripheral portion 25A which is formed into a generally rectangular outer shape. Similarly to the steering wheel 10, the peripheral supporting portion 16A of the supporting member 11A located in the grip portion 26A includes an annular protrusive portion 17 that is located in a vicinity of an outer edge of the peripheral supporting portion 16A and protrudes downwardly along the central axis C1 of rotation, and an annular flat portion 18 that is located in an upper surface 17a of the annular protrusive portion 17 and extends flatly towards the connecting portion 14 in a direction generally orthogonal to the central axis C1 of rotation. Both of the annular protrusive portion 17 and the annular flat portion 18 are arranged in the entire circumference of the outer peripheral portion 25A.

The grip portion 26A includes a grip body 27A that is adapted to be held by the driver. The grip body 27A includes a lower surface 27c located below the annular protrusive portion 17 of the peripheral supporting portion 16A of the supporting member 11A, an upper surface 27a located above the upper surface 17a of the annular protrusive portion 17, and an outer surface 27b that connects the upper surface 27a and lower surface 27c. In an underside of the outer peripheral portion 25A, the clad portion 20A has such a thickness to that makes the region from the lower surface 27c of the grip body 27A to a vicinity of the connecting portion 14 via the storing cove portion 28A generally flat, and the clad portion 20A is configured to have such a hardness that allows the clad portion 20A to be elastically deformed for forming the storing cove portion 28A when held by the driver.

The clad portion 20A has an Asker C hardness of approximately 40 which is within a range of 30 to 45 so as to form the storing cove portion 28A and provide a steady grip feeling.

Similarly to the steering wheel 10 of the foregoing embodiment, a flat portion 18a of the annular flat portion 18 of the rigid supporting member 11A extends to the connecting portion 14 inside the upper surface 27a of the grip body 27A. With this configuration, the driver MD is able to push his/her thumb F0 and thenar eminence DPM against the flat portion 18a of the annular flat portion 18 by elastically deforming an upper surface portion 21a of the soft clad portion 20 disposed in the upper surface 27a of the grip body 27, while a nice feeling is retained. In the lower surface 27c of the grip body 27A, the driver MD is able to grip the lower surface 27c of the grip body 27A with his/her index finger F1, middle finger F2, ring finger F3 and little finger F4 while elastically deforming a lower surface portion 21c and an inner surface portion 21d of the clad portion 20A and forming the storing cove portion 28, in the entire circumference of the outer peripheral portion 25A. As a consequence, although not provided with an opening for receiving the thumb F0, the grip body 27A in a vicinity of the annular protrusive portion 17 can be held adequately and operated steadily.

Therefore, the steering wheel 10A is easy to rotate for steering and has a good grip feeling although it is not provided with an opening for receiving driver's thumbs in a region between the boss section 23 and the outer peripheral portion 25A to be held for steering.

Furthermore, in a normal state not held by the driver, the steering wheel 10A has a flat shape with no unevenness in the underside of the outer peripheral portion 25A. This configuration gives the steering wheel 10A a novel appearance.

In the supporting member 11 of the steering wheel 10 in accordance with the exemplary embodiment, a region of the connecting portion 14 adjoining the annular flat portion 18 of the peripheral supporting portion 16 is formed into a flat shape flush with the annular flat portion 18 and is provided with a plurality of through holes 15. If dislocated from a region to be held by the driver MD, this region may be provided with an upward protruding portion for enhancing a strength of the supporting member 11.

What is claimed is:

1. A steering wheel for a vehicle adapted to be held by a driver and rotated around a central axis of rotation, the steering wheel comprising:
    a boss section that is located in a lower portion of the steering wheel and in a vicinity of the central axis of rotation;
    an outer peripheral portion that is disposed in an outer edge of the steering wheel in a direction orthogonal to the central axis of rotation in a circumference of the boss section;
    a grip portion that is located in the outer peripheral portion to be held by the driver for steering operation; and
    a central portion that covers an entirety of a region located farther towards the boss section than the outer peripheral portion including a region above the boss section, the central portion including a raised portion that protrudes farther upward than the outer peripheral portion along the central axis of rotation, wherein the raised portion includes, in an upper portion thereof, a cushion portion having such a resiliency that makes the cushion portion restorably dentable, wherein
    the cushion portion includes a cushion member that includes an inner layer and an outer layer,
    the inner layer is elastically deformable and shape retentive, and
    the outer layer is softer than the inner layer.

2. The steering wheel of claim 1, wherein a sheet member composed of a fabric is disposed on an outer surface of the cushion portion.

3. The steering wheel of claim 1, wherein:
    the raised portion is located in an inner side of the outer peripheral portion; and
    when viewed from above, each of the outer peripheral portion and the raised portion has a generally oval shape in which a width in a front and back direction is smaller than a width in a left and right direction.

4. The steering wheel of claim 3, wherein the outer peripheral portion as viewed from above has such a curved shape that an outer shape of a front edge has a greater curvature radius than that of a rear edge.

5. The steering wheel of claim 1, wherein:
    the grip portion is disposed in an entire circumference of the outer peripheral portion; and
    the raised portion of the central portion is located in an inner side of the outer peripheral portion such that a width in a front and back direction of a rear edge portion of the outer peripheral portion as viewed from above is greater than a width in the front and rear direction of a front edge portion of the outer peripheral portion as viewed from above.

6. The steering wheel of claim 1, wherein the cushion portion of the central portion is composed of a resilient material that has a bowl shape which interiorly has a void space.

7. The steering wheel of claim 6, further comprising:
    a projection device that is located inside of the central portion and configured to project a predetermined image on a back surface of the cushion portion; and
    a sheet member that is disposed on an outer surface of the raised portion and configured to allow the image projected by the projection device to be visible from an outside of the sheet member.

8. A steering wheel for a vehicle adapted to be held by a driver and rotated around a central axis of rotation, the steering wheel comprising:
    a boss section that is located in a lower portion of the steering wheel and in a vicinity of the central axis of rotation;
    an outer peripheral portion that is disposed in an outer edge of the steering wheel in a direction orthogonal to the central axis of rotation in a circumference of the boss section;

a grip portion that is disposed in an entire circumference of the outer peripheral portion to be held by the driver for steering operation;

a central portion that covers an entirety of a region located farther towards the boss section than the outer peripheral portion including a region above the boss section;

a supporting member for forming a skeleton of the steering wheel, the supporting member having a rigidity and such a shape that the boss section, the outer peripheral portion and the central portion are interconnected, the supporting member including a boss supporting portion that is located in the boss section, a peripheral supporting portion that is located in the outer peripheral portion, and a connecting portion that is located in the central portion and connects the boss supporting portion and the peripheral supporting portion; and a clad portion that is softer than the supporting member, the clad portion being mounted around at least the peripheral supporting portion and a portion of the connecting portion adjoining the peripheral supporting portion, wherein the peripheral supporting portion of the supporting member includes:

an annular protrusive portion that is located in a vicinity of an outer edge of the peripheral supporting portion and protrudes downwardly along the central axis of rotation, the annular protrusive portion being arranged in the entire circumference of the outer peripheral portion of the steering wheel; and an annular flat portion that is located in an upper surface of the annular protrusive portion and extends flatly towards the connecting portion in a direction generally orthogonal to the central axis of rotation, the annular flat portion being arranged in the entire circumference of the outer peripheral portion of the steering wheel; and wherein the grip portion includes:

a grip body that is adapted to be held by the driver, the grip body having a structure that the clad portion is disposed on the upper surface, an outer surface, and a lower surface of the annular protrusive portion of the peripheral supporting portion of the supporting member, thus the grip body including an upper surface located above the upper surface of the annular protrusive portion, a lower surface located below the annular protrusive portion, and an outer surface located on an outer side of the annular protrusive portion; and a storing cove portion for receiving fingers of the driver, the storing cove portion being located in an inner side of the annular protrusive portion in an underside of the annular flat portion of the outer peripheral portion of the supporting member and in a region where the clad portion is disposed, the storing cove portion being configured to be recessed farther upwardly than a portion of the lower surface of the grip body in a vicinity of a lower end of the annular protrusive portion, at least when the grip portion is held by the driver.

9. The steering wheel of claim 8, wherein, in an underside of the grip portion, the clad portion has such a thickness that makes the storing cove portion recessed farther upward than the lower surface of the grip body.

10. The steering wheel of claim 8, wherein:

in an underside of the outer peripheral portion, the clad portion has such a thickness that makes a region from the lower surface of the grip body to a vicinity of the connecting portion via the storing cove portion generally flat; and the clad portion is configured to have such a hardness that allows the clad portion to be elastically deformed for forming the storing cove portion when held by the driver.

11. The steering wheel of claim 8, wherein:

the central portion includes a raised portion that protrudes farther upward than the outer peripheral portion along the central axis of rotation; and the raised portion includes, in an upper portion thereof, a cushion portion having such a resiliency that makes the cushion portion restorably dentable.

12. A steering wheel for a vehicle adapted to be held by a driver and rotated around a central axis of rotation, the steering wheel comprising:

a boss section that is located in a lower portion of the steering wheel and in a vicinity of the central axis of rotation;

an outer peripheral portion that is disposed in an outer edge of the steering wheel in a direction orthogonal to the central axis of rotation in a circumference of the boss section;

a grip portion that is located in the outer peripheral portion to be held by the driver for steering operation; and a central portion that covers an entirety of a region located farther towards the boss section than the outer peripheral portion including a region above the boss section, the central portion including a raised portion that protrudes farther upward than the outer peripheral portion along the central axis of rotation, wherein the raised portion includes, in an upper portion thereof, a cushion portion having such a resiliency that makes the cushion portion restorably dentable, wherein the central portion continuously covers an entirety of a region defined by the outer peripheral portion which defines the outer edge of the steering wheel, including the region above the boss section so that there is no opening going through in an up and down direction as viewed from above the steering wheel in the region defined by the outer peripheral portion and between the central portion and outer peripheral portion.

13. The steering wheel of claim 12, wherein a sheet member composed of a fabric is disposed on an outer surface of the cushion portion.

14. The steering wheel of claim 12, wherein:

the raised portion is located in an inner side of the outer peripheral portion; and when viewed from above, each of the outer peripheral portion and the raised portion has a generally oval shape in which a width in a front and back direction is smaller than a width in a left and right direction.

15. The steering wheel of claim 14, wherein the outer peripheral portion as viewed from above has such a curved shape that an outer shape of a front edge has a greater curvature radius than that of a rear edge.

16. The steering wheel of claim 12, wherein:

the grip portion is disposed in an entire circumference of the outer peripheral portion; and the raised portion of the central portion is located in an inner side of the outer peripheral portion such that a width in a front and back direction of a rear edge portion of the outer peripheral portion as viewed from above is greater than a width in the front and rear direction of a front edge portion of the outer peripheral portion as viewed from above.

17. The steering wheel of claim 12, wherein the cushion portion of the central portion is composed of a resilient material that has a bowl shape which interiorly has a void space.

18. The steering wheel of claim 17, further comprising:
a projection device that is located inside of the central portion and configured to project a predetermined image on a back surface of the cushion portion; and
a sheet member that is disposed on an outer surface of the raised portion and configured to allow the image projected by the projection device to be visible from an outside of the sheet member.

* * * * *